(12) United States Patent
Taniguchi et al.

(10) Patent No.: US 8,971,766 B2
(45) Date of Patent: Mar. 3, 2015

(54) ELECTROPHOTOGRAPHIC MEMBER, PROCESS CARTRIDGE AND ELECTROPHOTOGRAPHIC APPARATUS

(71) Applicant: Canon Kabushiki Kaisha, Tokyo (JP)

(72) Inventors: Tomohito Taniguchi, Suntou-gun (JP); Hiroshi Mayuzumi, Yokohama (JP); Yusuke Yagisawa, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/909,922

(22) Filed: Jun. 4, 2013

(65) Prior Publication Data

US 2013/0266338 A1    Oct. 10, 2013

Related U.S. Application Data

(63) Continuation of application No. PCT/JP2012/007829, filed on Dec. 6, 2012.

(30) Foreign Application Priority Data

Dec. 14, 2011    (JP) .................................. 2011-273563

(51) Int. Cl.
*G03G 15/02* (2006.01)
*C08G 77/455* (2006.01)
*C08G 77/458* (2006.01)
*G03G 21/18* (2006.01)

(52) U.S. Cl.
CPC ............ *G03G 21/18* (2013.01); *G03G 15/0233* (2013.01)
USPC ............... 399/174; 399/176; 528/25; 528/28; 528/29; 528/39; 528/44; 528/76; 528/80; 528/288; 528/323; 528/324; 528/329.1

(58) Field of Classification Search
None
See application file for complete search history.

(56) References Cited

U.S. PATENT DOCUMENTS

| | | | |
|---|---|---|---|
| 7,381,510 B2 | 6/2008 | Akiyama et al. | |
| 8,227,087 B2 | 7/2012 | Mayuzumi et al. | |
| 8,277,947 B2 | 10/2012 | Mayuzumi et al. | |
| 8,383,234 B2 | 2/2013 | Mayuzumi et al. | |
| 8,445,113 B2 | 5/2013 | Furukawa et al. | |
| 8,548,359 B2 | 10/2013 | Taniguchi et al. | |
| 8,550,969 B2 | 10/2013 | Taniguchi et al. | |
| 2008/0069601 A1* | 3/2008 | Oshiba et al. ................. | 399/286 |
| 2011/0077363 A1* | 3/2011 | Manivannan et al. ........ | 525/453 |
| 2012/0065341 A1* | 3/2012 | Eling et al. .................... | 525/424 |
| 2012/0251171 A1 | 10/2012 | Muranaka et al. | |

FOREIGN PATENT DOCUMENTS

| | | |
|---|---|---|
| JP | 7-121009 A | 5/1995 |
| JP | 9-305005 A | 11/1997 |
| JP | 2000-63479 A | 2/2000 |
| JP | 2006-189894 A | 7/2006 |
| JP | 2006-274139 A | 10/2006 |
| JP | 2007-148225 A | 6/2007 |
| WO | 2012/132315 A1 | 10/2012 |

OTHER PUBLICATIONS

International Preliminary Report on Patentability, International Application No. PCT/JP2012/007829, Mailing Date Jun. 26, 2014.

* cited by examiner

*Primary Examiner* — Marc Zimmer
(74) *Attorney, Agent, or Firm* — Fitzpatrick, Cella, Harper & Scinto

(57) ABSTRACT

The present invention provides an electrophotographic member capable of more definitely suppressing occurrence of a C set image. The electrophotographic member has a surface layer including a modified polysiloxane having a structure represented by the following formula (1). In the formula (1), G represents a bivalent group having an ethylene oxide chain represented by ($-O-C_2H_4-$) and L represents polysiloxane having at least a $SiO_{4/2}$(Q) unit or a $SiO_{3/2}$(T) unit.

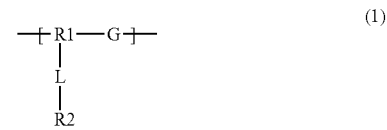

(1)

9 Claims, 4 Drawing Sheets

ELECTROPHOTOGRAPHIC MEMBER, PROCESS CARTRIDGE AND ELECTROPHOTOGRAPHIC APPARATUS

CROSS-REFERENCE TO RELATED APPLICATIONS

This application is a continuation of International Application No. PCT/JP2012/007829, filed Dec. 6, 2012, which claims the benefit of Japanese Patent Application No. 2011-273563, filed Dec. 14, 2011.

BACKGROUND OF THE INVENTION

1. Field of the Invention

The present invention relates to an electrophotographic member and a process cartridge used in an electrophotographic image forming apparatus (hereinafter referred to as the electrophotographic apparatus), and the electrophotographic apparatus.

2. Description of the Related Art

A large number of charging apparatuses used in electrophotographic apparatuses employ a contact charging method in which a surface of an electrophotographic photosensitive member is charged by applying a voltage to an electrophotographic member, namely, a charging member, disposed in contact with or close to the surface of the electrophotographic photosensitive member. In this method, a DC voltage alone or a voltage in which an AC voltage is superimposed on a DC voltage is generally applied to the charging member.

In order to stably conduct the contact charging, a conductive agent for adjusting conductivity is included in the charging member. Examples of the conductive agent include electron conductive agents such as carbon black and ion conductive agents such as quaternary ammonium salt.

If the charging member used in the contact charging is left to stand in a state in contact with an electrophotographic photosensitive member for a long period of time, deformation that cannot be easily recovered, namely, what is called compression set (hereinafter referred to as the "C set") is caused in a contact portion of the charging member in contact with the electrophotographic photosensitive member.

If the charging member is left to stand in an environment of high temperature and high humidity, the degree of the set becomes more serious. When the ion conductive agent is used as the conductive agent for the charging member, the ion conductive agent is unevenly distributed in a portion having the C set (hereinafter referred to as the "C set portion"), and hence, an electric resistance value of the C set portion is varied. As a result, there arises a difference in the electric resistance value between the C set portion and a non-C set portion.

Due to differences between the C set portion and the non-C set portion in the degree of the set and in the electric resistance value, a difference is caused in charging performance of the charging member. As a result, an electrophotographic image having striped unevenness in a position corresponding to the C set portion (hereinafter referred to as the "C set image") can be sometimes caused.

Japanese Patent Application No. 2006-189894 and Japanese Patent Application No. H07-121009 describe examples of a charging member including a polymer having a special quaternary ammonium salt or quaternary ammonium base.

SUMMARY OF THE INVENTION

The present inventors studied charging members described in Patent Literatures 1 and 2, and found that the degree of the set caused in the C set portion and the difference in the electric resistance value were not sufficiently decreased in these charging members, and that a C set image was still sometime caused. Electrophotographic apparatuses are recently required to show much higher speed performance and much higher image quality. As a result, even a charging member free from a C set image under conventional image forming conditions may cause a C set image due to increase of a process speed.

Accordingly, the present invention is directed to providing an electrophotographic member capable of more definitely suppressing formation of a C set image.

Further, the present invention is directed to providing a process cartridge and an electrophotographic apparatus capable of stably forming a high quality electrophotographic image.

According to one aspect of the present invention, there is provided an electrophotographic member having a surface layer, wherein the surface layer comprises a modified polysiloxane having a structure represented by the following formula (1):

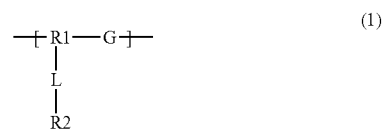

wherein, in the formula (1), G represents a bivalent group having an ethylene oxide chain represented by (—O—$C_2H_4$—); R1 represents a group selected from the group consisting of groups represented by the following formulas (2) and (3); L represents polysiloxane having at least a $SiO_{4/2}$ (Q) unit or a $SiO_{3/2}$(T) unit; and R2 represents a monovalent group selected from the group consisting of monovalent groups represented by the following formulas (4) and (5):

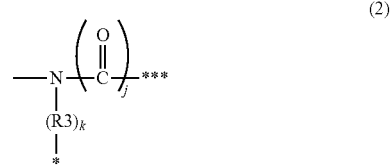

wherein, in the formula (2), j and k each independently represent 0 or 1; R3 represents a bivalent connecting group; the symbol "*" represents the point of attachment to a silicon atom in the polysiloxane represented by L; and the symbol "***" represents the point of attachment to an oxygen atom in the ethylene oxide chain represented by G,

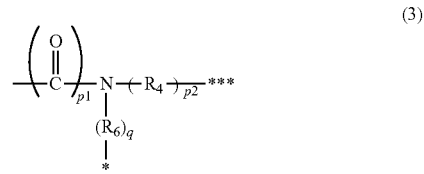

wherein, in the formula (3), p1, p2 and q each independently represent 0 or 1; R4 represents an alkylene group having 1 to 10 carbon atoms; R6 represents bivalent connecting group;

the symbol "*" represents the point of attachment to a silicon atom in the polysiloxane represented by L; and the symbol "***" represents the point of attachment to an oxygen atom in the ethylene oxide chain represented by G,

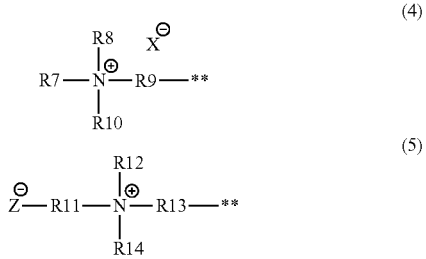

wherein, in the formulae (4) and (5), R7, R8, R10, R12 and R14 each independently represent a hydrogen atom, an alkyl group having 1 to 10 carbon atoms, a phenyl group, an alkoxyl group having 1 to 10 carbon atoms, or a phenoxy group; R9, R11 and R13 each represent a bivalent connecting group; and the symbol "**" represents the point of attachment to a silicon atom in the polysiloxane represented by L.

According to another aspect of the present invention, there is provided a process cartridge including a charging member and an electrophotographic photosensitive member disposed to be chargeable by the charging member, and having a structure removable from a main body of an electrophotographic apparatus, wherein the charging member is the aforementioned electrophotographic member.

According to still another aspect of the present invention, there is provided an electrophotographic apparatus including a charging member and an electrophotographic photosensitive member disposed to be chargeable by the charging member, wherein the charging member is the aforementioned electrophotographic member.

According to the present invention, C set of a contact portion and variation of an electric resistance value in the contact portion caused when an electrophotographic photosensitive member and an electrophotographic member are left to stand in contact with each other for a long period of time can be simultaneously suppressed, so that occurrence of a C set image can be suppressed.

Further features of the present invention will become apparent from the following description of exemplary embodiments with reference to the attached drawings.

DESCRIPTION OF THE EMBODIMENTS

Figure 1A:
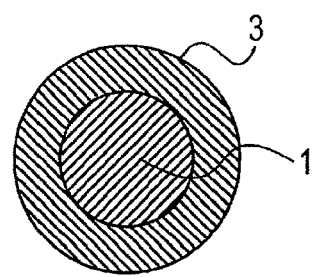
FIG. 1A is a cross-sectional view of an example of an electrophotographic member (an electrophotographic roller) according to the present invention.

Preferred embodiments of the present invention will now be described in detail in accordance with the accompanying drawings.

An electrophotographic member according to the present invention has a surface layer including a modified polysiloxane having a structure represented by the following formula (1) (hereinafter sometimes referred to as the "present polymer compound").

$$\begin{pmatrix} R1-G \end{pmatrix} \atop \begin{matrix} | \\ L \\ | \\ R2 \end{matrix} \tag{1}$$

In the formula (1), G represents a bivalent group having an ethylene oxide chain represented by (—O—C$_2$H$_4$—). R1 represents a group selected from the group consisting of groups represented by the following formulas (2) and (3). L represents polysiloxane having at least a SiO$_{4/2}$(Q) unit or a SiO$_{3/2}$(T) unit. R2 represents a monovalent group selected from the group consisting of monovalent groups represented by the following formulas (4) and (5).

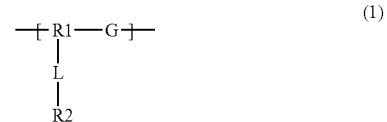

In the formula (2), j and k each independently represent 0 or 1, and R3 represents a bivalent connecting group. The symbol "*" represents the point of attachment to a silicon atom in the polysiloxane represented by L. The symbol "***" represents the point of attachment to an oxygen atom in the ethylene oxide chain represented by G.

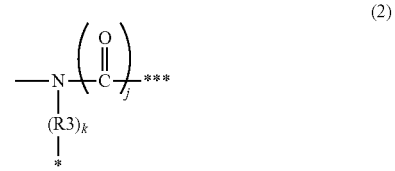

In the formula (3), p1, p2 and q each independently represent 0 or 1. R$_4$ represents an alkylene group having 1 to 10 carbon atoms. R$_6$ represents a bivalent connecting group. The symbol "*" represents the point of attachment to a silicon atom in the polysiloxane represented by L. The symbol "***" represents the point of attachment to an oxygen group in the ethylene oxide chain represented by G.

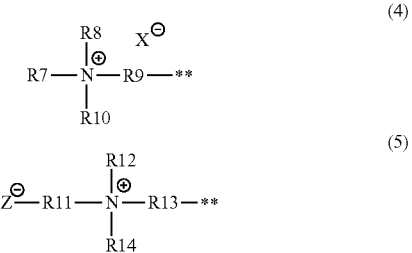

In the formula (4) or (5), R7, R8, R10, R12 and R14 each independently represent a hydrogen atom, an alkyl group having 1 to 10 carbon atoms, a phenyl group, an alkoxyl group having 1 to 10 carbon atoms or a phenoxy group. R9, R11 and R13 each represent a bivalent connecting group. The symbol "**" represents the point of attachment to a silicon atom in the polysiloxane represented by L.

The modified polysiloxane can be regarded as an organic-inorganic complex in which an organic polymer including a carbon atom, a hydrogen atom and a nitrogen atom is bonded to an inorganic polymer compound including a silicon atom and an oxygen atom. Since the modified polysiloxane has the ethylene oxide chain (—O—$C_2H_4$—) in a principal chain of the organic structure portion, the ionic conductivity of the surface layer can be improved. In particular, even under a low-temperature low-humidity environment, increase in the electric resistance value of the surface layer can be suppressed. In the formula (1), the polysiloxane portion represented by L (hereinafter sometimes referred to as the "inorganic structure portion") can suppress molecular motion in the organic-inorganic complex, can suppress occurrence of strain otherwise caused when stress is locally continuously applied to a part of the charging member or can reduce the degree of the strain.

Furthermore, a quaternary ammonium base or a group having a betaine structure (R2) represented by the formula (4) or (5) that is a functional group controlling the ionic conductivity of the surface layer is fixed in the inorganic structure portion. Therefore, variation in the electric resistance value of a C set portion can be suppressed.

Moreover, since the inorganic structure portion has at least the $SiO_{4/2}$(Q) unit or the $SiO_{3/2}$(T) unit, the dielectric constant of the surface layer can be improved, and the charging performance for an electrophotographic photosensitive member attained when the electrophotographic member of the present invention is used as a charging member can be improved. Owing to these effects, the charging member of the present invention can perform a uniform charging operation over a wide range of environment from a high-temperature high-humidity environment to a low-temperature low-humidity environment.

<Electrophotographic Member>

The present invention will now be described in detail by giving a roller type charging member (hereinafter sometimes referred to as a "charging roller") as a specific example of the electrophotographic member of the present invention.

Figure 1B:
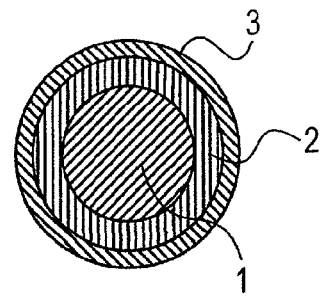
FIG. 1B is a cross-sectional view of another example of the electrophotographic member (the electrophotographic roller) according to the present invention.
Figure 1C:
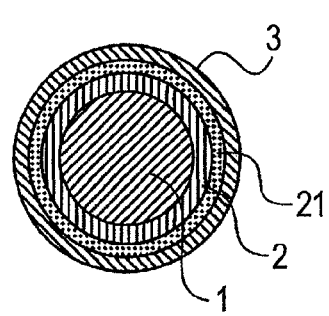
FIG. 1C is a cross-sectional view of another example of the electrophotographic member (the electrophotographic roller) according to the present invention.
Figure 1D:
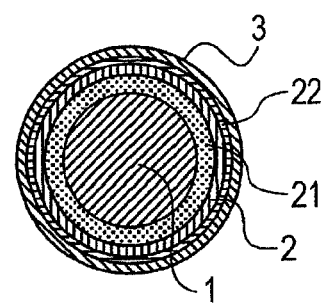
FIG. 1D is a cross-sectional view of another example of the electrophotographic member (the electrophotographic roller) according to the present invention.

FIG. 1A illustrates a charging roller including a conductive substrate 1 and a surface layer 3. FIG. 1B illustrates a charging roller including an elastic layer 2 between a conductive substrate 1 and a surface layer 3. FIG. 1C illustrates a charging roller including an intermediate layer 21 between an elastic layer 2 and a surface layer 3. FIG. 1D illustrates a charging roller including a first intermediate layer 21 and a second intermediate layer 22 between an elastic layer 2 and a surface layer 3.

Since such a charging roller is used in a state in contact with an electrophotographic photosensitive member, the charging roller can include an elastic layer. If durability is particularly required, two or more layers can be formed on the conductive substrate by providing the elastic layer 2 as in FIGS. 1B, 1C and 1D.

The conductive substrate and the elastic layer or the layer(s) successively stacked on the conductive substrate (such as the elastic layer 2 and the surface layer 3 of FIG. 1B) can be adhered to each other with an adhesive. In this case, the adhesive can be conductive. As an adhesive for attaining conductivity, any of known conductive agents can be used. Examples of a binder for the adhesive include thermosetting resins and thermoplastic resins, and any of known urethane, acrylic, polyester, polyether and epoxy resins can be used. As a conductive agent for providing the adhesive with conductivity, an appropriate one may be selected from conductive agents described in detail later, and one of the conductive agents may be singly used or two or more of the conductive agents may be used in combination.

In order to excellently charge a photosensitive member, the electric resistance value of the charging roller can be generally $1 \times 10^2 \Omega$ or more and $1 \times 10^{10} \Omega$ or less under an environment of a temperature of 23° C. and relative humidity of 50%.

Figure 2:
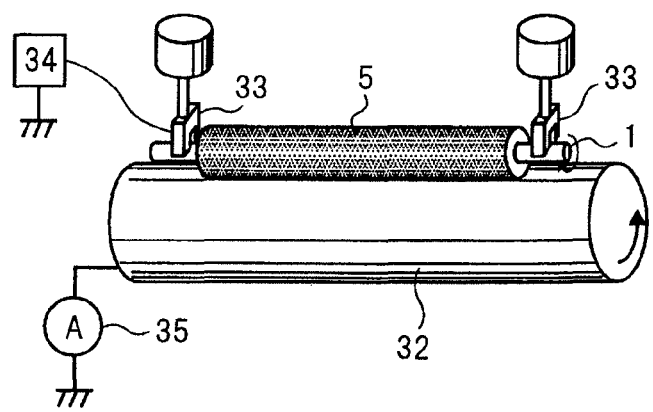
FIG. 2 is a schematic diagram of an instrument used for measuring an electric resistance value of the electrophotographic roller according to the present invention.

FIG. 2 illustrates one example of a method for measuring the electric resistance value of a charging roller 5. Both ends of a conductive substrate 1 are caught by loaded bearings 33 so that the charging roller 5 may be in parallel to and in contact with a cylindrical metal 32 having the same curvature as a photosensitive member. In this state, while rotating the cylindrical metal by a motor (not shown) for driven-rotating the charging roller in contact, a DC voltage of −200 V is applied to the charging roller from a stabilized power supply 34. A current thus allowed to flow is measured with an ammeter 35 so as to calculate the electric resistance value of the charging roller. In the present invention, the load applied to each end of the conductive substrate is 4.9 N, the cylindrical metal has a diameter of 30 mm and a rotational speed is set to a circumferential speed of 45 mm/sec.

From the viewpoint that a uniform nip width against a photosensitive member may be attained along the lengthwise direction, the charging roller can be in a shape having an outside diameter that is the largest in a center portion along the lengthwise direction and is reduced toward both end portions along the lengthwise direction, namely, what is called a crown shape. A degree of crown (i.e., an average difference between the outside diameter in the center portion and outside diameters in positions away from the center portion toward the both ends by 90 mm each) can be 30 μm or more and 200 μm or less.

The charging roller preferably has, on the surface thereof, ten point height of irregularities Rzjis (1.1 m) of 3 lam or more and 30 μm or less, and more preferably has, on the surface thereof, an average irregularity distance Sm (1.1 m) of 15 μm or more and 150 μm or less. When the ten point height of irregularities Rzjis and the average irregularity distance Sm fall within these ranges, a contact state between the charging roller and an electrophotographic photosensitive member can be more stabilized. Thus, the charging roller can easily uniformly charge the photosensitive member.

The ten point height of irregularities Rzjis and the average irregularity distance Sm are measured as follows: According to standards of surface roughness defined in JIS B0601-2001, a surface roughness tester "SE-3500" (trade name, manufactured by Kosaka Laboratory Ltd.) is used for the measurement. The ten point height of irregularities Rzjis is an average value of measured values respectively obtained in 6 points randomly selected as measurement points in the charging member. The average irregularity distance Sm is obtained by selecting 6 measurement points randomly in the charging member, measuring distances between 10 irregularities in each of the 6 measurement points for obtaining an average, and obtaining an average value of the averages of the 6 measurement points.

The surface of the charging member has hardness, in terms of microhardness (MD-1), of preferably 90° or less and more preferably 40° or more and 80° or less. When the hardness falls in this range, the contact with an electrophotographic photosensitive member can be easily stabilized, and hence, discharge can be more stably conducted within a nip portion. It is noted that the "microhardness (MD-1)" means hardness of the charging member measured with Asker rubber micro durometer MD-1 (trade name, manufactured by Kobunshi Keiki Co., Ltd.). Specifically, the charging member is left to stand in an environment of an ordinary temperature and ordinary humidity (a temperature of 23° C. and relative humidity of 55%) for 12 hours or more, the measurement is conducted with the durometer in a 10N peak hold mode, and the thus obtained value is regarded as the microhardness (MD-1).

[Conductive Substrate]

The conductive substrate used in the charging member of the present invention has conductivity and has a function to support the surface layer and the like provided thereon. Examples of a material for the conductive substrate include metals such as iron, copper, stainless steel, aluminum and nickel, and alloys of these metals.

[Surface Layer]

(Modified Polysiloxane)

The surface layer includes a modified polysiloxane represented by the following formula (1):

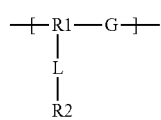

(1)

As shown in the formula (1) above, the modified polysiloxane of the present invention includes an ethylene oxide chain in a principal chain of the organic structure portion, and the quaternary ammonium base represented by the formula (4) or the group having a betaine structure represented by the formula (5) is bonded to the polysiloxane represented by L. Owing to this structure, the surface layer including the modified polysiloxane of the present invention shows excellent ionic conductivity so that an electrophotographic photosensitive member can be more uniformly charged.

In the formula (1), R1 represents a group represented by the following formula (2) or (3). Since the organic structure portion including the ethylene oxide chain of the polymer compound having this structure of the present invention is bonded to the inorganic structure portion L via the group represented by the formula (2) or the formula (3), the chemical stability of the polymer compound of the present invention can be improved.

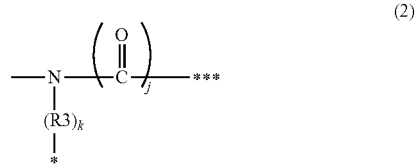

(2)

In the formula (2), j and k each independently represent 0 or 1, and R3 represents a bivalent connecting group. The symbol "*" represents the point of attachment to a silicon atom in the polysiloxane represented by L. The symbol "***" represents the point of attachment to an oxygen atom in the ethylene oxide chain represented by G.

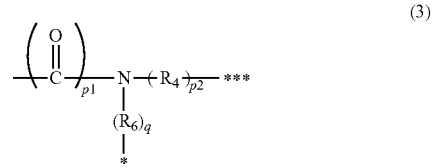

(3)

In formula (3), p1, p2 and q each independently represent 0 or 1. $R_4$ represents an alkylene group having 1 to 10 carbon atoms. $R_6$ represents a bivalent connecting group. The symbol "*" represents the point of attachment to a silicon atom in the polysiloxane represented by L. The symbol "***" represents the point of attachment to an oxygen atom in the ethylene oxide chain represented by G.

In the formula (1), a specific example of G includes a structure represented by the following formula (10):

(10)

Here, n corresponding to a repeating number of times of the ethylene oxide chain represents an integer of 1 or more, and n is particularly 5 or more, and can be 10 to 500. In this manner, the ionic conductivity of the surface layer can be further improved. As a result, the charging performance attained when the electrophotographic member of the present invention is used as a charging member can be further improved. The surface hardness of the charging member can be easily controlled to fall in the aforementioned suitable range.

The ethylene oxide chain of the formula (1) can be generally obtained through condensation polymerization of, for example, ethylene glycol, polyethylene glycol or polyethylene oxide.

Furthermore, G may include an organic group other than the unit represented by the formula (10), and another polyether bond, polyester bond or the like may be introduced into G. The polyether bond can be obtained through the condensation polymerization with polyalkylene oxide glycol, diol or the like used in addition to any of the aforementioned compounds.

Examples of the polyalkylene oxide glycol include poly(1, 2-propylene oxide)glycol, poly(1,3-propylene oxide)glycol, poly(tetramethylene oxide)glycol and poly(hexamethylene oxide)glycol.

Examples of the diol include: aliphatic diols such as propylene glycol, 1,4-butanediol, neopentyl glycol, 1,5-pentanediol and 1,6-hexanediol; and alicyclic diols such as bis(p-hydroxy)diphenyl, bis(p-hydroxyphenyl) methane and bis(p-hydroxyphenyl) propane.

Also in these compounds, the polyether bond other than the unit represented by the ethylene oxide chain (—O—C$_2$H$_4$—) can have 3 carbon atoms, and among these compounds, poly(1,2-propylene oxide)glycol, poly(1,3-propylene oxide)glycol or propylene glycol can be used. By using these compounds, the ionic conductivity of the surface layer can be improved, so as to improve charge uniformity of the charging member.

The polyester bond can be obtained through the condensation polymerization of ethylene glycol, polyethylene glycol or polyethylene oxide with dicarboxylic acid. Examples of the dicarboxylic acid include aliphatic dicarboxylic acid, aromatic dicarboxylic acid and alicyclic dicarboxylic acid. Examples of the aliphatic dicarboxylic acid include succinic acid, oxalic acid, adipic acid, sebacic acid and decanedicarboxylic acid. Examples of the aromatic dicarboxylic acid include terephthalic acid, isophthalic acid, phthalic acid, naphthalene-2,6-dicarboxylic acid, naphthalene-2,7-dicarboxylic acid, 4,4'-diphenyldicarboxylic acid and diphenoxyethane dicarboxylic acid. Examples of the alicyclic dicarboxylic acid include 1,3-cyclohexanedicarboxylic acid, 1,2-cyclohexanedicarboxylic acid, 1,3-cyclobutanedicarboxylic acid, 1,3-cyclopentanedicarboxylic acid, 1,3-dicarboxymethylcyclohexane, 1,4-dicarboxymethylcyclohexane and dicyclohexyl-4,4'-dicarboxylic acid.

In these compounds, a polyester bond other than the unit represented by the formula (10) preferably has 1 to 10 carbon atoms between carboxyl groups. More preferably, the polyester bond is an alkylene group having 1 to 4 carbon atoms, or a phenylene group in which a hydrogen atom may be substituted by a methyl group or an ethyl group. These compounds can be used to improve the ionic conductivity of the surface layer so as to improve the charge uniformity of the charging member.

In one specific example of the organic structure portion of the modified polysiloxane represented by the formula (1) according to the present invention, R1 represents the group represented by the formula (2), and in the formula (2), j is 0 or 1, k is 1, and the bivalent connecting group represented by R3 has a structure represented by the following formula (6):

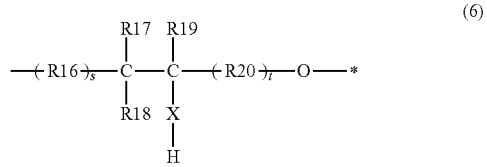

(6)

In the formula (6), s and t each independently represent 0 or 1. R17, R18 and R19 each independently represent a hydrogen atom or an alkyl group having 1 to 5 carbon atoms. X represents an oxygen atom or a sulfur atom. R16 and R20 each independently represent an alkylene group having 1 to 10 carbon atoms, or a phenylene group in which a hydrogen atom may be substituted by a methyl group or an ethyl group. The symbol "*" represents the point of attachment to a silicon atom in the polysiloxane represented by L.

Such an organic structure portion of the modified polysiloxane can be formed for example, through a reaction caused between an NH structure portion of polyurethane, which is obtained by reacting polyol having the unit represented by the formula (10) with diisocyanate, and an epoxy ring represented by formula (14) described later in metal alkoxide represented by formula (13) described later. In this case, j is 1 in the formula (2).

In another specific example of the organic structure portion, R1 is the group represented by the formula (2), and j is 1 and k is 0 in the formula (2). The modified polysiloxane mentioned as another specific example is obtained by reacting the aforementioned polyurethane with tetraalkoxysilane, trialkoxysilane having no reactive functional group or the like.

In still another specific example of the organic structure portion, R1 is the group represented by the formula (3), and in the formula (3), p1, p2 and q each represent 1, and R6 has a structure represented by the following formula (7).

(7)

In the formula (7), v and w each independently represent an integer of 0, or 1 or more, and R21 and R25 each independently represent an alkylene group having 1 to 10 carbon atoms, or a phenylene group in which a hydrogen atom may be substituted by a methyl group or an ethyl group. The symbol "*" represents the point of attachment to a silicon atom in the polysiloxane represented by L.

The organic structure portion of this modified polysiloxane can be obtained, for example, by the following method: Polyether polyol having the unit represented by the formula (10) and acrylonitrile are reacted with each other, and the resultant is subjected to a hydrogenation reaction, so as to modify a terminal of the polyether polyol into an amino group. The thus obtained polyether polyol having a modified amino terminal is reacted with dicarboxylic acid, so as to obtain polyamide. When the acrylonitrile is reacted, R4 of the formula (3) is an ethylene group, and the carbon number of the group R4 may be appropriately adjusted.

Subsequently, an amino group of the polyamide and an isocyanate group represented by formula (16) described later in alkoxysilane represented by the formula (13) described later are reacted with each other, so as to obtain the modified polysiloxane having an organic structure portion having the structure of the formula (7).

In another specific example of the organic structure portion, R1 is the group represented by the formula (3), and in the formula (3), p1, p2 and q each represent 1, and R6 has the structure represented by the formula (6). In this case, the above-described polyamide is reacted with alkoxysilane having a functional group represented by formula (14) described later. At this point, a three-membered ring of the formula (14) and the "NH structure portion" of the polyamide are reacted with each other, so as to obtain the modified polysiloxane having the structure of the formula (6).

The modified polysiloxane in which q is 0 in the formula (3) is obtained by reacting the above-described polyurethane with tetraalkoxysilane, trialkoxysilane having no reactive functional group or the like. The modified polysiloxane in which p1 is 0 and p2 is 1 in the formula (3) is obtained by reacting polyamine, which is obtained by reacting a terminal of the above-described polyol with aqueous ammonia, hydrogen or the like, with the above-described alkoxysilane.

L represents the polysiloxane having at least the SiO$_{4/2}$(Q) unit or the SiO$_{2/2}$(T) unit. Polysiloxane generally has any one of a SiO$_{2/2}$(D) unit, a SiO$_{2/2}$(T) unit and a SiO$_{4/2}$(Q) unit, and L of the formula (1) has at least the SiO$_{4/2}$(Q) unit or the $SiO_{2/2}$(T) unit. Thus, an effect to suppress the molecular motion in the modified polysiloxane can be exhibited.

L of the formula (1) may further have a $SiO_{2/2}$(M) unit or a $SiO_{2/2}$(D) unit as long as L has any of the aforementioned units. L of the formula (1) may include another atom in addition to silicon (Si) which forms L of the formula (1). Examples of another atom include titanium (Ti), zirconium (Zr) and hafnium (Hf). Among these atoms, titanium (Ti) can be suitably included. Thus, the dielectric constant of the surface layer can be further improved, so as to further improve the charging performance of the charging member.

R2 represents a monovalent group selected from the group consisting of monovalent groups represented by the formulas (4) and (5). The formula (4) represents a quaternary ammonium base. The formula (5) represents a group having a betaine structure.

In the formula (4) or (5), R7, R8, R10, R12 and R14 each independently represent a hydrogen atom, an alkyl group having 1 to 10 carbon atoms, a phenyl group, an alkoxyl group having 1 to 10 carbon atoms or a phenoxy group. R9, R11 and R13 each represent a bivalent connecting group. The symbol "**" represents the point of attachment to a silicon atom in the polysiloxane represented by L.

Furthermore, R7 and R8 may be each an atom group necessary for forming a nitrogen-containing five-membered or six-membered ring structure together with a N atom. Thus, a degree of freedom of the quaternary ammonium base or the group having a betaine structure can be improved, and at the same time, interaction with an ether bond represented by the formula (10) can be improved. As a result, the ionic conductivity of the surface layer can be improved and the charge uniformity of the charging member can be improved.

R11 can be an alkylene group having 1 to 10 carbon atoms and particularly a linear alkylene group having 3 to carbon atoms. By using such a group, the ionic conductivity of the surface layer can be improved.

X$^-$ is an anion, and examples include halogen ions such as F$^-$, Cl$^-$, Br$^-$ and I$^-$; ClO$_4^-$, BF$_4^-$, SO$_4^-$, HSO$_4^-$, CH$_3$SO$_4^-$, C$_2$H$_5$SO$_4^-$, CH$_3$SO$_3^-$, CH$_3$SO$_3^-$, C$_2$H$_5$SO$_3^-$ and COOH$^-$. Among these anions, Cl$^-$, Br$^-$, ClO$_4^-$, BF$_4^-$, HSO$_4^-$ and C$_2$H$_5$SO$_4^-$ are more preferably used from the viewpoint of the improvement of the ionic conductivity of the surface layer.

Z$^-$ is an anion, and examples include CO$_2^-$, SO$_3^-$ and PO$_3$H$^-$. Among these anions, CO$_2^-$ and SO$_3^-$ are more preferably used. Thus, the ionic conductivity of the surface layer can be improved.

R9 of the formula (4) and R13 of the formula (5) each represent a bivalent group for defining a length from the polysiloxane represented by L to the quaternary ammonium base or the group having a betaine structure. R9 and R13 can include a linear alkylene structure having 3 to 15 carbon atoms. Thus, a degree of freedom in movement of the quaternary ammonium base or the group having a betaine structure can be improved. As a result, such a group effectively functions to improve the conductivity of the surface layer. Furthermore, when the degree of freedom in the movement of such a group is improved, the interaction with the ethylene oxide chain included in G of the formula (1) can be improved. This improvement also effectively further improves the ionic conductivity of the surface layer.

Examples of a structure of R9 of the formula (4) include structures represented by the following formulas (8) and (9).

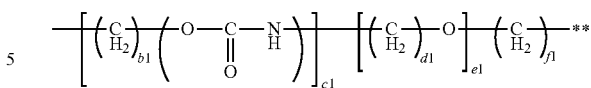

In the formula (8), b1, c1, d1, e1 and f1 each independently represent an integer of 0 or 1 to 10, and b1+c1+d1+e1+f1≥1. At least one selected from b1, d1 and f1 can be an integer of 3 to 15.

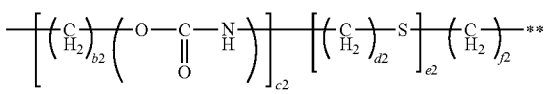

In the formula (9), b2, c2, d2, e2 and f2 each independently represent an integer of 0 or 1 to 10, and b2+c2+d2+e2+f2≥1. At least one selected from b2, d2 and f2 can be an integer of 3 to 15.

Furthermore, an example of a structure of R13 of the formula (5) includes a structure represented by the following formula (11) or (12):

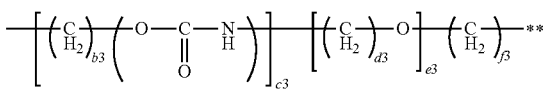

In the formula (11), b3, c3, d3, e3 and f3 each independently represent an integer of 0 or 1 to 10, and b3+c3+d3+e3+f3≥1. At least one selected from b3, d3 and f3 can be an integer of 3 to 15.

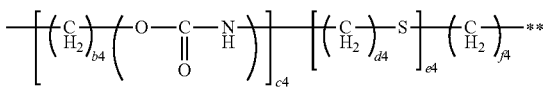

In the formula (12), b4, c4, d4, e4 and f4 each independently represent an integer of 0 or 1 to 10, and b4+c4+d4+e4+f4≥1. At least one selected from b4, d4 and f4 can be an integer of 3 to 15.

Furthermore, in the formulas (8), (9), (11) and (12), the symbol "**" represents the point of attachment to a silicon atom in the polysiloxane represented by L.

(Conductive Particulates)

The conductive surface layer of the present invention can include known conductive particulates as long as the ionic conductivity of the conductive surface layer is not inhibited.

Examples of the conductive particulates include: particulates or fiber of metals such as aluminum, palladium, iron, copper and silver; metal oxides such as titanium oxide, tin oxide and zinc oxide; composite particles obtained by further subjecting the metal particulates, the fiber or the metal oxides to a surface treatment through electrolysis, spray coating or mixing/shaking; and carbon black and carbon-based particulates. Examples of the carbon black include black furnace black, thermal black, acetylene black and ketjen black.

The conductive particulates may have surfaces thereof surface-treated with any of the following finishing agents. Examples of a usable finishing agent include: organic silicon compounds such as alkoxysilane, fluoroalkylsilane and polysiloxane; various coupling agents prepared from silane, titanate, aluminate and zirconate; and oligomers and polymer compounds. One of these agents can be singly used or two or more of the agents can be used together. Among these agents, the organic silicon compounds such as alkoxysilane and polysiloxane and the various coupling agents prepared from silane, titanate, aluminate and zirconate are preferably used, and the organic silicon compounds are more preferably used.

If the conductive particulates are used, conductive particulates having an average particle size of 0.0 μm to 0.9 μm, and particularly, 0.01 μm to 0.5 μm are suitably used.

(Insulating Particles)

The conductive surface layer of the present invention may include known insulating particles as long as the ionic conductivity of the surface layer is not inhibited.

Examples of a material for the insulating particles include zinc oxide, tin oxide, indium oxide, titanium oxide (including titanium dioxide and titanium monoxide), iron oxide, silica, alumina, magnesium oxide, zirconium oxide, strontium titanate, calcium titanate, magnesium titanate, barium titanate, calcium zirconate, barium sulfate, molybdenum disulfide, calcium carbonate, magnesium carbonate, dolomite, talk, kaolin clay, mica, aluminum hydroxide, magnesium hydroxide, zeolite, wollastonite, diatom earth, glass beads, bentonite, montmorillonite, hollow glass bulbs, organic metal compounds and organic metal salts. Alternatively, iron oxides such as ferrite, magnetite and hematite, and activated carbon can be used.

The examples further include particles of the following polymer compounds: a polyamide resin, a silicone resin, a fluororesin, a (meth)acrylic resin, a styrene resin, a phenol resin, a polyester resin, a melamine resin, a urethane resin, an olefin resin, an epoxy resin, resins of copolymers, modified compounds and derivatives of these resins, an ethylene-propylene-diene copolymer (EPDM), styrene-butadiene copolymer rubber (SBR), silicone rubber, urethane rubber, isoprene rubber (IR), butyl rubber, chloroprene rubber (CR), and thermoplastic elastomers such as polyolefin thermoplastic elastomers, urethane thermoplastic elastomers, polystyrene thermoplastic elastomers, fluororubber thermoplastic elastomers, polyester thermoplastic elastomers, polyamide thermoplastic elastomers, polybutadiene thermoplastic elastomers, ethylene-vinyl acetate thermoplastic elastomers, polyvinyl chloride thermoplastic elastomers and chlorinated polyethylene thermoplastic elastomers.

(Other Additives)

The conductive surface layer of the present invention can further include, together with the organic-inorganic complex polymer, a known binder material as long as the ionic conductivity of the surface layer is not inhibited. As the binder material, any of known rubbers or resins may be used.

The conductive surface layer of the present invention can further include a die lubricant for improving releasability thereof.

[Formation of Conductive Surface Layer]

The surface layer including the modified polysiloxane of the present invention can be formed through the following steps 1 to 4. It is noted that a process conducted through steps 2 to 4 is generally designated as a sol-gel process, and the surface layer including the organic-inorganic complex polymer (the present polymer compound) can be formed through a hydrolysis reaction and a condensation reaction of metal alkoxide.

Step 1:

A polymer including the unit represented by the formula (10), such as polyurethane, polyamide, polyamine or polyol having a hydroxyl group in a side chain (hereinafter referred to as the "polymer P") is prepared.

Step 2:

The polymer P and metal alkoxide including silicon as a central metal are mixed and stirred, so as to cause a reaction between an "NH structure portion" or an "OH structure portion" of the polymer P and the metal alkoxide including silicon as a central metal. Here, in addition to the metal alkoxide including silicon as a central metal, a metal alkoxide including, as a central metal, a metal selected from titanium, zirconium and hafnium can be used.

The metal alkoxide used in step 2 is sometimes referred to as the "metal alkoxide A". The metal alkoxide A may have a functional group reacted with the NH structure portion or the OH structure portion of the polymer P. The polymer P and the metal alkoxide A may be mixed and stirred in the presence of water, a solvent or the like.

Step 3:

To the mixture obtained in step 2, metal alkoxide having a structure represented by the formula (4) or (5) is added, and the resultant mixture is further mixed and stirred.

The metal alkoxide having the structure represented by the formula (4) or (5) used in this step is sometimes referred to as the "metal alkoxide B".

Step 4:

The thus obtained mixture is applied on a conductive substrate, and thereafter, is dried, and if necessary, heated or the like, so as to form the surface layer including the organic-inorganic complex polymer of the present invention. At the time of the application, the mixture can be adjusted to an appropriate concentration by diluting the mixture with water, a solvent or the like.

(Polymer)

The polymer P having the unit represented by the formula (10) can be prepared by a known method. The polymer has a number average molecular weight of preferably 1000 or more and 10000 or less and more preferably 2000 or more and 6000 or less.

Polyurethane usable in the present invention can be prepared by preparing polyol having the unit represented by the formula (10) and causing a reaction of the polyol with isocyanate reactive with the polyol. Examples of the isocyanate include chain aliphatic isocyanate, cyclic aliphatic isocyanate, aromatic isocyanate and aromatic-aliphatic isocyanate.

Examples of the chain aliphatic isocyanate include methylene diisocyanate, isopropylene diisocyanate, butane-1,4-diisocynate, hexamethylene diisocyanate, 2,2,4-trimethylhexamethylene diisocyanate, 2,4,4-trimethylhexamethylene diisocyanate, and dimer diisocyanate in which a carboxyl group of dimer acid is substituted by an isocyanate group.

Examples of the cyclic aliphatic isocyanate include cyclohexane-1,4-diisocynate, isophorone diisocyanate, dicyclohexylmethane-4,4'-diisocyanate, 1,3-di(isocyanate methyl) cyclohexane and methylcyclohexane diisocyanate.

Examples of the aromatic isocyanate include: dialkyldiphenylmethane diisocyanate such as 4,4'-diphenyldimethylmethane diisocyanate; tetraalkyldiphenylmethane diisocyanate such as 4,4'-diphenyltetramethylmethane diisocyanate; 1,5-naphthylene diisocyanate, 4,4'-diphenylmethane diisocyanate, 4,4'-dibenzyl isocyanate, 1,3-phenylene diisocyanate, 1,4-phenylene diisocyanate, 2,4-tolylene diisocyanate and 2,6-tolylene diisocyanate.

Examples of the aromatic-aliphatic isocyanate include xylylene diisocyanate and m-tetramethyl xylylene diisocyanate. Such isocyanate may be a monomer, a dimer or a trimer.

Polyamide usable in the present invention can be prepared by modifying, with diamine, a terminal of polyol having the unit represented by the formula (10) and reacting the thus obtained diamine modified polyol with the dicarboxylic acid. The modification with diamine can be performed by causing a reaction between a diamine compound or diamine-carboxylate and the polyol. Examples of the diamine compound include ethylene diamine, propylene diamine, tetramethylene diamine, hexamethylene diamine, isophorone diamine, dicyclohexylmethane-4,4'-diamine and phenylene diamine. Examples of the diamine-carboxylate include hexamethylenediamine-adipate, hexamethylenediamine-sebacate and hexamethylenediamine-isophthalate.

Alternatively, a terminal of polyol may be converted into an amino group by reacting the polyol having the unit represented by the formula (10) with acrylonitrile and subjecting the resultant to a hydrogenation reaction. The aforementioned polyamide can be obtained by reacting the thus obtained terminal modified amino compound with the dicarboxylic acid.

Polyamine usable in the present invention can be obtained by further reacting the amine compound described with regard to the modification with diamine of the polyamide in producing the polyurethane through the reaction between the polyol and the isocyanate. Alternatively, the polyamine can be obtained by reacting, in addition to the diamine compound, an amine compound having a primary amino group and a secondary amino group. The primary amino group with high reactivity alone reacts with the isocyanate and the secondary amino group remains without reacting. Examples of such an amine compound include triethylenetetramine and diethylenetriamine.

Further alternatively, the polyamine can be obtained by reacting polyol having the unit represented by the formula (10) with ammonia, hydrogen or the like.

The polyol having a hydroxyl group in a side chain usable in the present invention can be obtained by further reacting the diamine compound having a hydroxyl group in preparing the polyurethane through the reaction between polyol and isocyanate. In this case, an amino group alone reacts with the isocyanate or the like and a hydroxyl group remains without reacting. Examples of such an amine compound having a hydroxyl group include 2-hydroxyethylethylenediamine, 2-hydroxyethylpropylenediamine, di-2-hydroxyethylpropylenediamine, 2-hydroxypropylethylenediamine and di-2-hydroxypropylethylenediamine.

(Metal Alkoxide A)

The metal alkoxide A usable in the present invention can be represented by the following formula (13):

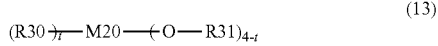

(13)

In the formula (13), R30 represents a group selected from the group consisting of an alkyl group having to 5 carbon atoms, a vinyl group, an allyl group, a phenyl group in which a hydrogen atom may be substituted by a methyl group or an ethyl group, and groups represented by the formulas (14) to (16).

R31 represents a hydrogen atom, an alkyl group having 1 to 6 carbon atoms, or a phenyl group in which a hydrogen atom may be substituted by a methyl group or an ethyl group. It is noted that a hydrogen atom can be substituted by a hydroxyl group, a methyl group or an ethyl group in the alkyl group having 1 to 6 carbon atoms used as the group R31.

M20 represents silicon, titanium, zirconium or hafnium, and t represents an integer of 0 to 2. Metal alkoxides having the groups M20 of silicon, titanium, zirconium and hafnium are generally referred to as alkoxy silane, alkoxy titanium, alkoxy zirconium and alkoxy hafnium, respectively.

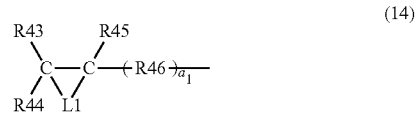

(14)

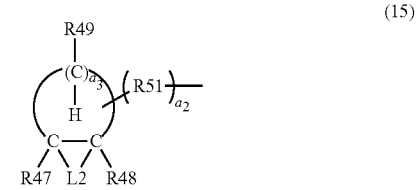

(15)

(16)

In the formulas (14), (15) and (16), a1 and a2 represent 0 or 1. L1 and L2 represent an oxygen atom or a sulfur atom.

R46, R50 and R51 each independently represent an alkylene group having 1 to 10 carbon atoms or a phenylene group in which a hydrogen atom may be substituted by a methyl group or an ethyl group. R43, R44, R45, R47, R48 and R49 each independently represent a hydrogen atom or an alkyl group having 1 to 5 carbon atoms, and a3 represents an integer of 3 to 8. It is noted that a hydrogen atom can be substituted by a methyl group or an ethyl group in the alkylene group having 1 to 10 carbon atoms used as the group R46, R50 or R51.

Examples of the alkoxy silane include tetraalkoxy silane, trialkoxy silane and dialkoxy silane. Examples of the tetraalkoxy silane include tetramethoxysilane, tetraethoxysilane, tetrapropoxysilane, tetraisopropoxysilane and tetrabutoxysilane. Examples of the trialkoxy silane include methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, vinyltrimethoxysilane, vinyltriethoxysilane, phenyltrimethoxysilane and phenyltriethoxysilane. Examples of the dialkoxy silane include dimethyldimethoxysilane, dimethyldiethoxysilane, diethyldimethoxysilane and diethyldiethoxysilane.

Examples of the alkoxy titanium include tetramethoxy titanium, tetraethoxy titanium, tetra(n-propoxy) titanium, tetra (i-propoxy) titanium, tetra(n-butoxy) titanium, tetra(t-butoxy) titanium, tetrapentoxy titanium, tetrahexoxy titanium, tetrakis (2-methylhexoxytitanium), dipropoxybis(trimethanolaminato) titanium and dihydroxybis(lactato) titanium.

Examples of the alkoxy zirconium include tetramethoxy zirconium, tetraethoxy zirconium, tetra-n-propoxy zirconium, tetra-n-propoxy zirconium, tetra-1-propoxy zirconium, tetra-n-butoxy zirconium, tetra-t-butoxy zirconium, tetra-2-ethylhexanoate zirconium and tetra-2-methyl-2-butoxy zirconium.

Examples of the alkoxy hafnium include tetraethoxy hafnium, tetra-1-propoxy hafnium, tetra-n-butoxy hafnium, tetra-t-butoxy hafnium, 2-ethylhexoxy hafnium and 2-methoxymethyl-2-propoxy hafnium.

The metal alkoxide having a functional group reacted with the NH structure portion or the OH structure portion of the polymer P is a metal alkoxide in which R30 of the formula (13) is any one of the groups represented by the formulas (14), (15) and (16). In this case, the reactivity between the NH structure portion or the OH structure portion of the polymer P and the group R30 can be easily controlled, and hence, the formation of the structure represented by the formula (1) can be more easily controlled.

Examples of alkoxysilane having a functional group reacted with the NH structure portion or the OH structure portion of the polymer P include
4-(1,2-epoxybutyl)trimethoxysilane, 5,6-epoxyhexyltriethoxysilane, 8-oxysilane-2-yloctyltrimethoxysilane, 8-oxysilane-2-yloctyltriethoxysilane, 3-glycidoxypropyltrimethoxysilane, 3-glycidoxypropyltriethoxysilane, 1-(3,4-epoxycyclohexyl)ethyltrimethoxysilane, 1-(3,4-epoxycyclohexyl)ethyltriethoxysilane, 3-(3,4-epoxycyclohexyl)ethyltriethoxysilane, 3-(3,4-epoxycyclohexyl)ethyltrimethoxysilane, 3-(3,4-epoxycyclohexyl)ethyltriethoxysilane, 3-mercaptopropyltriethoxysilane, 3-isocyanatepropyltriethoxysilane, 3-isocyanatepropylmonomethyldiethoxysilane and 3-isocyanatepropyldimethylethoxysilane.

Examples of alkoxy titanium having a functional group reacted with the NH structure portion or the OH structure portion of the polymer P include 3-glycidoxypropyltrimethoxy titanium, 3-glycidoxypropyltriethoxy titanium, 3-glycidoxypropyltri(n-propoxy)titanium, 3-glycidoxypropylmethyldimethoxy titanium, 3-glycidoxypropylmethyldiethoxy titanium, 3-glycidoxypropylmethyldi(n-propoxy)titanium, 3-glycidoxypropylmethyldi(i-propoxy)titanium, 2-(3,4-epoxycyclohexyl)ethyltrimethoxy titanium, 2-(3,4-epoxycyclohexyl)ethyltriethoxy titanium, 2-(3,4-epoxycyclohexyl)ethyltri(n-propoxy)titanium, 2-(3,4-epoxycyclohexyl)ethyltri(i-propoxy)titanium and 3-isocyanatepropyltriethoxy titanium.

Examples of another metal alkoxide having a functional group reacted with the NH structure portion or the OH structure portion of the polymer P include alkoxy zirconium and alkoxy hafnium having a functional group represented by the formula (14), (15) or (16).

The metal alkoxide having a functional group represented by the formula (14), (15) or (16) can be reacted with metal alkoxide not having such a functional group so as to produce a condensate, and the condensate can be reacted with the NH structure portion or the OH structure portion of the polymer P.

(Metal Alkoxide B)

The metal alkoxide B used in step 3 is a metal alkoxide having a structure represented by the formula (4) or (5) in which R30 of the formula (13) is the group represented by the formula (4) or (5).

The amount of the metal alkoxide A used in step 2 is 1 to 70 parts by mass and particularly preferably 2 to 50 parts by mass based on 100 parts by mass of the polymer P. Thus, aggregation of the inorganic structure portion in the polymer compound can be easily suppressed.

The amount of the metal alkoxide B used in step 3 is 1 to 30 parts by mass and particularly preferably 2 to 15 parts by mass based on 100 parts by mass of the polymer P. Thus, the ionic conductivity of the conductive surface layer can be improved, and at the same time, the aggregation of the inorganic structure portion in the polymer compound can be easily suppressed.

(Solvent)

As the solvent for use in step 2 and step 3, a solvent capable of dissolving the polymer P and the metal alkoxide is used. Specific examples include the following:

Alcohols such as methanol, ethanol and isopropyl alcohol; ketones such as acetone, methyl ethyl ketone and cyclohexanone; amides such as N,N-dimethylformamide and N,N-dimethylacetamide; sulfoxides such as dimethyl sulfoxide; ethers such as tetrahydrofuran, dioxane and ethylene glycol monomethyl ether; esters such as methyl acetate and ethyl acetate; and aromatic compounds such as xylene, ligroin, chlorobenzene and dichlorobenzene.

In steps 2 to 4, the polysiloxane portion L including at least one of the $SiO_{4/2}$(Q) unit and the $SiO_{3/2}$(T) unit is produced through hydrolysis and condensation of the metal alkoxide A, and in addition, the metal alkoxide A reacts with the NH structure portion or the OH structure portion of the polymer P. Furthermore, an ionic conductive group represented by the formula (4) or (5) is introduced into the polysiloxane portion L through hydrolysis and condensation of the metal alkoxide B. As a result, the organic-inorganic polymer having the structure represented by the formula (1) is produced.

In using the metal alkoxide A having a functional group reacted with the NH structure portion or the OH structure portion of the polymer P in step 2, the reaction between the NH structure portion or the OH structure portion and the functional group can be preferentially proceeded. In this case, the reaction of step 2 can be conducted through a thermal reaction in anhydrous state if possible. Thus, the reaction between the functional group and the polymer P can be promoted with the hydrolysis of the metal alkoxide A suppressed. The reaction temperature is 25° C. to 150° C. and particularly can be 40 to 120° C. The reaction time can be approximately 1 to 10 hours. In this reaction, a known catalyst can be used for accelerating the reaction.

It is noted that steps 2 and 3 may be performed as one step, but these steps are more preferably performed as separate steps from the viewpoint that the formation of the structure represented by the formula (1) can be more easily controlled.

Water necessary for the hydrolysis and the condensation reaction in step 4 can be obtained by utilizing moisture present in the air, or water can be added to the reaction. After the application, the applied mixture can be dried at room temperature or can be appropriately heated at 200° C. or less.

(Catalyst)

For further accelerating the hydrolysis and the condensation reaction of the metal alkoxide A and the metal alkoxide B, a catalyst can be added to the mixture. Examples of the catalyst include an organic acid, an inorganic acid, tertiary amine and an alkaline catalyst. Preferable examples of the organic acid include formic acid, acetic acid and paratoluene sulfonic acid, and preferable examples of the tertiary amine include triethylamine, dimethylethanolamine and methyldiethanolamine.

The content of the catalyst can be approximately 0.001 to 50 mol %, in molar fraction, based on the used metal alkoxide A and metal alkoxide B. For example, paratoluene sulfonic acid or tertiary amine having a high catalytic effect can be used in a content of approximately 0.001 to 5 mol %, and formic acid or acetic acid having a low catalytic effect can be used in a content of approximately 0.01 to 50 mol %.

(Coating Method)

The conductive surface layer can be formed on the conductive substrate by a coating method such as electrostatic spraying or dip coating. Alternatively, the conductive surface layer can be formed by adhering or covering a sheet-shaped or tube-shaped layer having been formed into a prescribed thickness onto or over the conductive substrate. Alternatively, a method for forming the conductive surface layer by curing a material into a prescribed shape within a mold having the conductive substrate therein can be employed. In particular, the method for forming a coat film by coating the conductive substrate with a coating solution by the coating method can be suitably employed.

A diluent solvent for a reactant or a reaction solution can be any solvent as long as the solvent can uniformly dilute the reactant or the reaction solution. Specific examples include alcohols such as methanol, ethanol and isopropyl alcohol.

As a method for dispersing, in the coating solution, substances to be included in the conductive surface layer, such as conductive particulates and insulating particles described later, a known dispersing unit such as a ball mill, a sand mill, a paint shaker, a Dinomill or a pearl mill can be used.

(The Other Points)

The specific volume resistance of the conductive surface layer is obtained as follows: First, the conductive resin layer is cut out from the charging member into a shape of a rectangle in a size of approximately 5 mm×5 mm×1 mm. The thus cut rectangular piece is provided with an electrode and a guard electrode through vapor deposition of a metal on both faces thereof, so as to obtain a measurement sample. If the conductive surface layer is too thin to cut, a coat film is formed on an aluminum sheet by applying a conductive composition for forming the conductive surface layer, and a metal is vapor deposited on the coated surface, so as to obtain a measurement sample. To the thus obtained measurement sample, a voltage of 200 V is applied by using a microammeter (trade name: ADVANTEST R8340A ULTRA HIGH RESISTANCE METER, manufactured by Advantest Corporation). Then, a current flowing 30 seconds after the voltage application is measured, so as to calculate the specific volume resistance based on a film thickness and an electrode area.

The conductive surface layer can be subjected to a surface treatment. Examples of the surface treatment include a surface finishing treatment using UV or electron beams, and a surface modifying treatment performed by adhering a compound onto the surface layer and/or immersing the surface layer in the compound.

[Conductive Elastic Layer]

In the charging member of the present invention, a conductive elastic layer can be formed between the conductive substrate and the conductive surface layer. As a binder material used in the conductive elastic layer, any of known rubbers and resins can be used. From the viewpoint that a sufficient nip is secured between the charging member and a photosensitive member, the binder material preferably has comparatively low elasticity, and rubber is more preferably used. Examples of the rubber include natural rubber, rubber obtained by vulcanizing natural rubber, and synthetic rubber.

As the synthetic rubber, ethylene propylene rubber, styrene butadiene rubber (SBR), silicone rubber, urethane rubber, isoprene rubber (IR), butyl rubber, acrylonitrile butadiene rubber (NBR), chloroprene rubber (CR), acrylic rubber, epichlorohydrin rubber and fluororubber can be used.

The specific volume resistance of the conductive elastic layer can be $10^2$ Ω·cm or more and $10^{10}$ Ω·cm or less in an environment of a temperature of 23° C. and relative humidity of 50%. The specific volume resistance of the conductive elastic layer can be adjusted by appropriately adding, to the binder, any of the aforementioned conductive particulates and ion conductive agents.

If the binder material is polar rubber, ammonium salt can be particularly used. The conductive elastic layer may include, in addition to the conductive particulates, an additive such as a plasticizing oil or a plasticizer or the aforementioned insulating particles for adjusting the hardness or the like. The conductive elastic layer can be adhered to the conductive substrate or the conductive surface layer with an adhesive. As the adhesive, a conductive adhesive can be used.

The specific volume resistance of the conductive elastic layer can be measured in the same manner as in the aforementioned measurement method for the specific volume resistance of the surface layer by using a measurement sample obtained as follows: A material for the conductive elastic layer is molded into a sheet with a thickness of 1 mm, and a metal is vapor deposited on both faces of the sheet for forming an electrode and a guard electrode thereon, so as to obtain the measurement sample for the specific volume resistance.

<Electrophotographic Apparatus>

Figure 3:
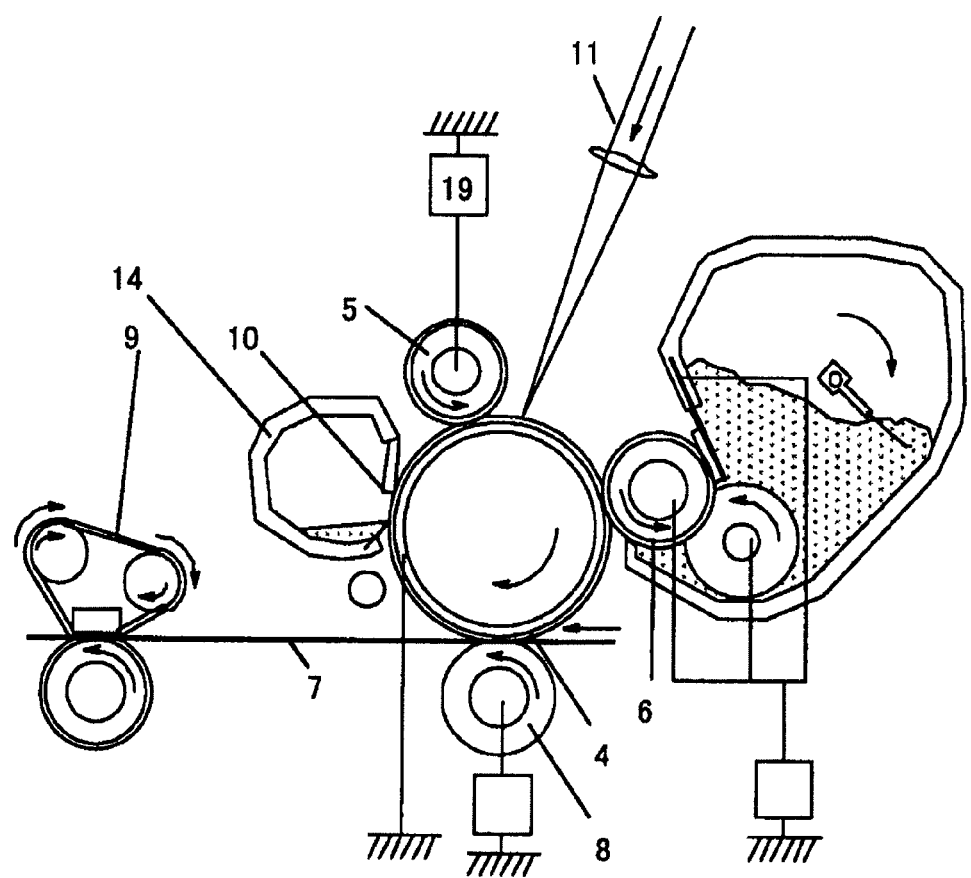
FIG. 3 is a schematic diagram illustrating an example of a cross-section of an electrophotographic apparatus according to the present invention.

An electrophotographic apparatus of the present invention includes the charging member of the present invention and an electrophotographic photosensitive member disposed to be chargeable by the charging member. An example of the rough structure of the electrophotographic apparatus of the present invention is illustrated in FIG. 3. This electrophotographic apparatus includes an electrophotographic photosensitive member, a charging apparatus for charging the electrophotographic photosensitive member, a latent image forming apparatus for performing exposure, a developing apparatus for developing a latent image into a toner image, a transferring apparatus for transferring the toner image onto a transfer material, a cleaning apparatus for collecting a transfer toner remaining on the electrophotographic photosensitive member, a fixing apparatus for fixing the toner image, and the like.

The electrophotographic photosensitive member 4 is a rotating drum type photosensitive member having a photosensitive layer on a conductive substrate. The electrophotographic photosensitive member is driven to rotate in an arrow direction at a prescribed circumferential speed (process speed). The charging apparatus includes a contact type charging roller 5 disposed in contact with the electrophotographic photosensitive member by being abutted against the electrophotographic photosensitive member with prescribed pressing force. The charging roller is driven rotated according to the rotation of the electrophotographic photosensitive, member and charges the electrophotographic photosensitive member to a prescribed potential under application of a prescribed DC voltage supplied from a charging power supply 19.

As the latent image forming apparatus 11 for forming an electrostatic latent image on the electrophotographic photosensitive member, an exposing apparatus such as a laser beam scanner is used. An electrostatic latent image is formed by performing exposure according to image information on the electrophotographic photosensitive member uniformly charged. The developing apparatus includes a developing sleeve or a developing roller 6 disposed in the vicinity of or in contact with the electrophotographic photosensitive member. The electrostatic latent image is developed into a toner image through discharged area development using a toner having been electrostatically processed to the same polarity as the charge polarity of the electrophotographic photosensitive member. The transferring apparatus includes a contact type transfer roller 8. The transferring apparatus transfers the toner image from the electrophotographic photosensitive member to a transfer material 7 such as paper. The transfer material is conveyed by a paper feeding system including a conveying member. The cleaning apparatus includes a cleaning member 10 in the shape of a blade and a collection vessel 14, so that a transfer residual toner remaining on the electrophotographic photosensitive member after transferring the image can be mechanically scraped off and collected. Here, the cleaning apparatus can be omitted by employing a development simultaneous cleaning method for collecting the transfer residual toner by the developing apparatus. The fixing apparatus 9 includes a heated roller and the like, and fixes the transferred toner image on the transfer material and discharges the resultant transfer material outside.

<Process Cartridge>

A process cartridge of the present invention includes the charging member of the present invention and an electrophotographic photosensitive member disposed to be chargeable by the charging member, and has a structure removable from a main body of an electrophotographic apparatus. An electrophotographic photosensitive member, a charging apparatus, a developing apparatus, a cleaning apparatus and the like can be integrated to be used as a process cartridge designed to be removable from an electrophotographic apparatus.

EXAMPLES

The present invention will now be described in more detail by describing specific production examples and examples. Production Examples PE-1 to PE-6 are production examples of polyether polyols 1 to 6, Production Examples 1 to 9 are production examples of polyurethane solutions 1 to 9, Production Example 10 is a production example of epoxy group-containing alkoxysilane 1, Production Examples 11 and 12 are production examples of polyamide solutions 1 and 2, and Production Examples 13 and 14 are production examples of conductive rubber compositions 1 and 2.

Production Example PE-1

Preparation of Polyether Polyol 1

A reactor was charged with 62 parts by mass of ethylene glycol and 13 parts by mass of potassium hydroxide. The atmosphere in the reactor was replaced by nitrogen, and the reactor was heated to 120° C. for conducting vacuum dehydration for 4 hours. Thereafter, 2200 parts by mass of ethylene oxide was added thereto, and a polymerization reaction was conducted at 100° C. The reactant was stirred at 120° C. for 2 hours and was degassed under reduced pressure for 2 hours while keeping the temperature at 100° C. Thereafter, sodium pyrophosphate oxide was added thereto as a neutralizer, and the resultant was stirred at 90° C. for 1 hour and further stirred at 120° C. for 1 hour. Subsequently, magnesium silicate (trade name: KW600, manufactured by Kyowa Chemical Industry Co., Ltd.) in an amount corresponding to 0.5 mass % of polyether polyol expected to be produced was added thereto, and the resultant was stirred at 120° C. for 1 hour and degassed under reduced pressure for 2 hours. The resultant reactant was filtered for separating a solid component, and the solid component was purified, so as to obtain polyether polyol 1 having a structure represented by the formula (10) in which n=50.

Production Example PE-2

Preparation of Polyether Polyol 2

Polyether polyol 2 was obtained in the same manner as in Production Example PE-1 except that the amount of the ethylene oxide was changed to 880 parts by mass. Polyether polyol 2 had a structure represented by the formula (10) in which n=20.

Production Example PE-3

Preparation of Polyether Polyol 3

Polyether polyol 3 was obtained in the same manner as in Production Example PE-1 except that the amount of the ethylene oxide was changed to 4400 parts by mass. Polyether polyol 3 had a structure represented by the formula (10) in which n=100.

Production Example PE-4

Preparation of Polyether Polyol 4

Polyether polyol 4 was obtained in the same manner as in Production Example PE-1 except that 76 parts by mass of propylene glycol was used instead of 62 parts by mass of ethylene glycol and that the amount of the ethylene oxide was changed to 22000 parts by mass. Polyether polyol 4 had a structure represented by the formula (10) in which n=500.

Production Example PE-5

Preparation of Polyether Polyol 5

Polyether polyol 5 was obtained in the same manner as in Production Example PE-1 except that the amount of the ethylene oxide was changed to 1500 parts by mass. Polyether polyol 5 had a structure represented by the formula (10) in which n=33.

Production Example PE-6

Preparation of Polyether Polyol 6

Polyether polyol 6 was obtained in the same manner as in Production Example PE-1 except that the amount of the ethylene oxide was changed to 440 parts by mass and that the amount of the polypropylene oxide was changed to 400 parts by mass. Polyether polyol 6 had a structure represented by the formula (10) in which n=5.

Production Example 1

Preparation of Polyurethane Solution 1

A reactor was charged with 1000 parts by mass of polyether polyol 1 obtained in Production Example PE-1 and 280 parts by mass of isophorone diisocyanate, and a reaction was conducted at 100° C. in a nitrogen atmosphere for 6 hours. After the reaction, 550 parts by mass of methyl ethyl ketone was added thereto, so as to prepare a polymer solution.

Next, a mixed solution of 72 parts by mass of isophorone diamine, 4 parts by mass of di-n-butylamine, 910 parts by mass of methyl ethyl ketone and 600 parts by mass of isopropyl alcohol was prepared. To this mixed solution, 1000 parts by mass of the polymer solution was added, and a reaction was conducted at 50° C. for 3 hours, so as to obtain polyurethane solution 1. It is noted that the thus prepared polyurethane had a number average molecular weight of approximately 5000 and that the content of solid component in the polyurethane solution was approximately 40 mass %.

Production Example 2

Preparation of Polyurethane Solution 2

A reactor vessel was charged with 500 parts by mass of polyether polyol 1 and 108 parts by mass of isophorone diisocyanate, and a reaction was conducted at 80° C. in a nitrogen atmosphere for 4 hours. After the reaction, 1090 parts by mass of methyl ethyl ketone was added thereto, so as to prepare a polymer solution. The polymer solution was cooled to 50° C.

Next, a mixed solution of 37 parts by mass of isophorone diamine, 3 parts by mass of di-n-butylamine and 540 parts by mass of isopropyl alcohol was prepared. The mixed solution was added to the polymer solution over 10 minutes, and a reaction was conducted at 50° C. for 1 hour, so as to obtain polyurethane solution 2. It is noted that the thus obtained polyurethane had a number average molecular weight of approximately 5000 and that the content of solid component in the polyurethane solution was approximately 30 mass %.

Production Example 3

Preparation of Polyurethane Solution 3

A reactor vessel was charged with 1000 parts by mass of polyether polyol 1 and 280 parts by mass of isophorone diisocyanate, and a reaction was conducted at 100° C. in a nitrogen atmosphere for 6 hours. After the reaction, 300 parts by mass of dimethylformamide was added thereto, so as to prepare a polymer solution.

Next, a mixed solution of 105 parts by mass of isophorone diamine, 16 parts by mass of 2-hydroxyethylethylenediamine, 8 parts by mass of di-n-butylamine and 3300 parts by mass of dimethylformamide was prepared. To this mixed solution, 1580 parts by mass of the polymer solution was added, and a reaction was conducted at 50° C. for 3 hours, so as to obtain polyurethane solution 3. It is noted that the thus obtained polyurethane had a number average molecular weight of approximately 10000 and that the content of solid component in the polyurethane solution was approximately 30 mass %.

Production Example 4

Preparation of Polyurethane Solution 4

An esterification reaction can was charged with materials listed in a table below, and a reaction was conducted at 220° C. in a nitrogen atmosphere for 2 hours. Subsequently, the thus obtained reaction solution was moved to a polymerization can, 0.1 part by mass of tetrabutyl titanate was further added thereto, and polymerization was conducted at 250° C. under reduced pressure of 0.5 mmHg for 3 hours.

TABLE 1

| Material | parts by mass |
|---|---|
| Polyether polyol 2 (Production Example 2) | 56.3 |
| Terephthalic acid | 20 |
| 1,3-Propanediol | 20 |
| Tetrabutyl titanate | 0.1 |

A reactor vessel was charged with 1000 parts by mass of the thus obtained polymer and 280 parts by mass of isophorone diisocyanate, and a reaction was conducted at 100° C. in a nitrogen atmosphere for 6 hours. After the reaction, 550 parts by mass of methyl ethyl ketone was added thereto, so as to prepare a polymer solution.

Next, a mixed solution of 72 parts by mass of isophorone diamine, 4 parts by mass of di-n-butylamine, 910 parts by mass of methyl ethyl ketone and 600 parts by mass of isopropyl alcohol was prepared. To this mixed solution, 1000 parts by mass of the polymer solution was added, and a reaction was conducted at 50° C. for 3 hours, so as to obtain polyurethane solution 4. It is noted that the thus obtained polyurethane had a number average molecular weight of approximately 7000 and that the content of solid component of the polyurethane solution was approximately 40 mass %.

Production Example 5

Preparation of Polyurethane Solution 5

An esterification reaction can was charged with materials listed in a table below, and a reaction was conducted at 220° C. in a nitrogen atmosphere for 2 hours. Subsequently, the thus obtained reaction solution was moved to a polymerization can, 0.1 part by mass of tetrabutyl titanate was added thereto, and polymerization was conducted at 250° C. under reduced pressure of 0.5 mmHg for 3 hours.

TABLE 2

| Material | parts by mass |
|---|---|
| Polyether polyol 3 (Production Example 3) | 56.3 |
| Terephthalic acid | 20 |
| 1,3-Propanediol | 20 |
| Tetrabutyl titanate | 0.1 |

A reactor vessel was charged with 1000 parts by mass of the thus obtained polymer and 300 parts by mass of isophorone diisocyanate, and a reaction was conducted at 100° C. in a nitrogen atmosphere for 6 hours. After the reaction, 600 parts by mass of methyl ethyl ketone was added thereto, so as to prepare a polymer solution.

Next, a mixed solution of 72 parts by mass of isophorone diamine, 4 parts by mass of di-n-butylamine, 1000 parts by mass of methyl ethyl ketone and 600 parts by mass of isopropyl alcohol was prepared. To this mixed solution, 1000 parts by mass of the polymer solution was added, and a reaction was conducted at 50° C. for 3 hours, so as to obtain polyurethane solution 5. It is noted that the thus obtained polyurethane had a number average molecular weight of approximately 10000 and that the content of solid component in the polyurethane solution was approximately 30 mass %.

Production Example 6

Preparation of Polyurethane Solution 6

Polyurethane solution 6 was prepared in the same manner as in Production Example 1 except that polyether polyol 1 was replaced with polyether polyol 3. The thus obtained polyurethane had a number average molecular weight of approximately 3000 and the content of solid component in the polyurethane solution was approximately 40 mass %.

Production Example 7

Preparation of Polyurethane Solution 7

Polyurethane solution 7 was prepared in the same manner as in Production Example 5 except that 56.3 parts by mass of polyether polyol 3 (Production Example PE-3) was replaced with 20 parts by mass of polyether polyol 5 (Production Example PE-5) and that the used solvents were all replaced with acetone. The thus obtained polyurethane had a number average molecular weight of approximately 20000 and the content of solid component in the polyurethane solution was approximately 20 mass %.

Production Example 8

Preparation of Polyurethane Solution 8

Polyurethane solution 8 was prepared in the same manner as in Production Example 3 except that 2-hydroxyethylethylenediamine was replaced with diethylenetriamine. The thus obtained polyurethane had a number average molecular weight of approximately 10000 and the content of solid component in the polyurethane solution was approximately 30 mass %.

Production Example 9

Preparation of Polyurethane Solution 9

Polyurethane solution 9 was prepared in the same manner as in Production Example 1 except that polyether polyol 1 was replaced with polyether polyol 6 (Production Example PE-6). The thus obtained polyurethane had a number average molecular weight of approximately 5000 and the content of solid component in the polyurethane solution was approximately 40 mass %.

Production Example 10

Preparation of Epoxy Group-Containing Alkoxysilane 1

A reactor vessel equipped with a stirrer and a diversion device was charged with 1400 parts by mass of glycidol (trade name: Epiol OH, manufactured by Nippon Yushi Co., Ltd.) and 8600 parts by mass of tetramethoxysilane (trade name: Methylsilicate 51, manufactured by Tama Chemicals Co., Ltd.), these materials were heated to 90° C. with stirring in a nitrogen atmosphere, and then, 2 parts by mass of dibutyltin dilaurate was added thereto as a catalyst, and a reaction was conducted. During the reaction, methanol was distilled off by using the diversion device, and when the amount became 600 parts by mass, the reactant was cooled to room temperature. Time necessary for cooling was 5 hours. After cooling, a pressure of 13 kPa was applied for approximately 10 minutes for eliminating residual methanol under reduced pressure, so as to obtain epoxy group-containing alkoxysilane 1.

Production Example 11

Preparation of Polyamide Solution 1

A reactor vessel was charged with 340 parts by mass of polyether polyol 3, and after heating to 120° C. in a nitrogen atmosphere, 11.2 parts by mass of acrylonitrile was added thereto over 1 hour, and a reaction was conducted for 3 hours. Thereafter, 0.5 part by mass of a Raney nickel catalyst (manufactured by Kawasaki Fine Chemical Co., Ltd.) and 0.2 part by mass of a 13% lithium hydroxide aqueous solution were introduced thereto, and the atmosphere in the reactor vessel was replaced by a hydrogen gas. After heating to 110° C., the reactant was maintained until no hydrogen could be absorbed. The reactant was further maintained for 30 minutes after no hydrogen could be absorbed. Thereafter, the resultant was cooled to 80° C., and the catalyst and moisture were removed therefrom, so as to obtain a compound of polyether polyol 3 having both terminals modified with an amino group. A salt reaction was caused between this compound and terephthalic acid by a general method, so as to obtain a 40 mass % aqueous solution of ammonium terephthalate.

A condensation can was charged with 200 parts by mass of the 40 mass % aqueous solution of ammonium terephthalate, 102 parts by mass of caprolactam and 16 parts by mass of a 40 mass % aqueous solution of hexamethylenediammonium adipate, and water was removed by heating to 110° C. so as to condense the resulting mixture to attain a polymeric component concentration of 80 mass %. Subsequently, the thus obtained condensed solution was moved to a polymerization can, the atmosphere in the polymerization can was replaced by nitrogen and the condensed solution was heated to 120° C. After adding 10 parts by mass of 3,5,1-trimethyl-2,4,6-tri(3,5-di-t-butyl-hydroxybenzyl)benzene thereto, the resultant solution was heated to 245° C. with stirring. Polymerization was conducted at 245° C. for 10 hours. The thus obtained polymer was discharged onto a cooling belt and pelletized, so as to obtain polyamide in the form of pellets. This polyamide was dissolved in methyl ethyl ketone, so as to obtain polyamide solution 1 including 20 mass % of solid component.

Production Example 12

Preparation of Polyamide Solution 2

Polyamide solution 2 was prepared in the same manner as in Production Example 11 except that polyether polyol 3 was replaced with polyether polyol 5 (Production Example PE-5).

Production Example 13

Preparation of Conductive Rubber Composition 1

To 100 parts by mass of epichlorohydrin rubber (EO-EP-AGE terpolymer, EO/EP/AGE=73 mol %/23 mol %/4 mol %), materials listed in a table below were added, and the resulting mixture was kneaded with an enclosed mixer controlled to 50° C. for 10 minutes, so as to prepare a raw material compound.

TABLE 3

| Material | parts by mass |
|---|---|
| Calcium carbonate (trade name: Silver W, manufactured by Shiraishi Kogyo Kaisha, Ltd.) | 80 |
| Adipate (trade name: Polycizer W305ELS, manufactured by Nippon Ink Chemicals, Inc.) | 8 |
| Zinc stearate (trade name: SZ-2000, manufactured by Sakai Chemical Industry Co., Ltd.) | 1 |
| 2-Mercaptobenzimidazole (MB) (antioxidant) | 0.5 |
| Zinc oxide (trade name: Zink White No. 2, manufactured by Sakai Chemical Industry Co., Ltd.) | 2 |
| Quaternary ammonium salt "ADK Cizer LV70" (trade name, manufactured by Adeka Corporation) | 2 |
| Carbon black "Thermax Floform N990" (trade name, manufactured by Cancarb, Canada, average particle size: 270 nm) | 5 |

To the raw material compound, 0.8 part by mass of sulfur serving as a vulcanizing agent, 1 part by mass of dibenzothiazyl sulfide (DM) and 0.5 part by mass of tetramethylthiuram monosulfide (TS) serving as accelerators were added. Subsequently, the resultant mixture was kneaded with a twin-roll mill cooled to 20° C. for 10 minutes, so as to prepare conductive rubber composition 1.

Production Example 14

Preparation of Conductive Rubber Composition 2

To 10 parts by mass of acrylonitrile butadiene rubber (NBR) (trade name: N230SV, manufactured by JSR Corporation), materials listed in a table below were added, and the resulting mixture was kneaded with an enclosed mixer controlled to 50° C. for 15 minutes.

TABLE 4

| Material | parts by mass |
|---|---|
| Carbon black (trade name: TOKABLACK #7360SB, manufactured by Tokai Carbon Co., Ltd.) | 65 |
| Zinc stearate (trade name: SZ-2000, manufactured by Sakai Chemical Industry Co., Ltd.) | 1 |
| Zinc oxide (trade name: Zinc White No. 2, manufactured by Sakai Chemical Industry Co., Ltd.) | 5 |
| Calcium carbonate (trade name: Silver W, manufactured by Shiraishi Kogyo Kaisha, Ltd.) | 20 |

To the resultant mixture, 1.2 parts by mass of sulfur serving as a vulcanizing agent and 4.5 parts by mass of tetrabenzylthiuram disulfide (TBzTD) (trade name: Perkacit TBzTD, manufactured by Flexsys K.K.) serving as an accelerator were added. Subsequently, the resultant mixture was kneaded with a twin-roll mill cooled to 25° C. for 10 minutes, so as to prepare conductive rubber composition 2.

Example 1

[1. Conductive Substrate]

A thermosetting adhesive including 10 mass % of carbon black was applied on a stainless steel substrate having a diameter of 6 mm and a length of 252.5 mm and was dried, and the resultant was used as a conductive substrate.

[2. Production of Conductive Elastic Roller D-1]

An extruder equipped with a crosshead was used for coating conductive rubber composition 1 prepared in Production Example 13 on the conductive substrate set as a central axis into a cylindrical shape. A coating layer thus formed was adjusted to have a thickness of 1.5 mm. The thus extruded roller was heated with a hot stove at 170° C. for 1 hour, ends of an elastic layer (that is, the coating layer having been cured) were removed so as to attain a length of 228 mm, and the resultant was further subjected to secondary heating at 160° C. for 1 hour. An outer peripheral face of the resultant roller was polished with a plunge-cut cylindrical grinding machine, so as to produce conductive elastic roller D-1. It is noted that a degree of crown of this roller (i.e., an average difference in the outside diameter between a center portion thereof and positions away from the center portion toward the both ends by 90 mm each) was 120 μm.

[3. Preparation of Surface Layer Forming Coating Solution A-1]

A reactor vessel was charged with 1250 parts by mass of polyurethane solution 1 (having a concentration of solid component of 40% and including 500 parts by mass of solid component), and after heating to 50° C., 25 parts by mass of epoxy-group containing alkoxysilane 1 prepared in Production Example 10 was added thereto. This amount corresponds to 5 parts by mass based on 100 parts by mass of the polyurethane. A reaction was conducted at 60° C. in a nitrogen atmosphere for 4 hours, and thereafter, 25 parts by mass of a compound represented by the following formula (A-1) was added thereto. This amount corresponds to 5 parts by mass based on 100 parts by mass of the polyurethane. Subsequently, a reaction was conducted in a nitrogen atmosphere for 2 hours, so as to obtain a conductive resin solution.

Methyl ethyl ketone was added to the conductive resin solution so as to adjust the concentration of solid component to approximately 20 mass %, and at the same time, 0.08 part by mass of modified dimethyl silicone oil (trade name: SH28PA, manufactured by Dow Corning Toray Co., Ltd.) based on 100 parts by mass of the solid component was added thereto.

A glass bottle with an internal volume of 450 mL was charged with 200 parts by mass of the mixed solution obtained as above and 4 parts by mass of crosslinked polymethyl methacrylate resin particles with an average particle size of 10 μm (trade name: MBX-10, manufactured by Sekisui Plastics Co., Ltd.) together with 200 parts by mass of glass beads with an average particle size of 0.8 mm serving as a medium. The resultant was dispersed for 5 minutes with a paint shaker disperser, and the glass beads were removed, so as to prepare surface layer forming coating solution A-1. The amount of the crosslinked polymethyl methacrylate resin particles corresponds to 10 parts by mass based on 100 parts by mass of the polyurethane.

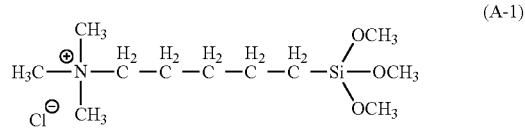 [SMILES: CO[Si](CCCCC[N+](C)(C)C)(OC)OC ; [Cl-]]

(A-1)

[4. Formation of Conductive Surface Layer]

Conductive elastic roller D-1 was dip-coated once with surface layer forming coating solution A-1 with the lengthwise direction of the conductive elastic roller set to the vertical direction. After air-drying the resultant roller at ordinary temperature for 30 minutes, the roller was further dried with a circulating hot air dryer at 80° C. for 30 minutes, so as to obtain charging roller 1. Herein, the dip coating was performed under the following conditions: The dip time was 9 seconds, and the dip coating draw-up rate was linearly varied with time from an initial rate of 20 mm/s to an ultimate rate of 2 mm/s.

[5. Measurement and Evaluation]

Charging roller 1 was subjected to measurements and evaluation as described below. Also in each of Examples 2 to 74 and Comparative Examples 1 to 7 described later, each charging roller obtained therein was subjected to similar measurements and evaluation. The results are shown in Tables 5 to 11 below.

[5-1. Structure of Polymer Compound]

A polymer compound included in the surface layer was identified for a detailed structure thereof. A measurement sample was prepared as follows:

First, methyl ethyl ketone was added to a conductive resin solution obtained in the same manner as described in "Preparation of surface layer forming coating solution A-1", so as to prepare a solution having a concentration of a solid component of approximately 20 mass %. This solution was dropped onto an aluminum sheet having been defatted with ketone or alcohol, so as to form a film by spin coating (performed at 300 rpm for 2 seconds). After forming the film, the film was air dried at ordinary temperature for 30 minutes and further dried with a circulating hot air dryer at 80° C. for 30 minutes, and the thus obtained thin film of the polymer compound was crushed to be used as a measurement sample.

This measurement sample was used for analysis through $^{13}$C-NMR, $^{1}$H-NMR, $^{17}$O-NMR and IR measurement, so as to identify details of a structure represented by R1 in the formula (1) (namely, the structure represented by the formula (2) or (3)). The result is shown in Table 7. In the polymer compound of this example, R1 and R3 had a structure represented by formula (C-1) shown in Table 7.

Furthermore, details of an inorganic structure portion of the formula (1) were identified through analysis of $^{29}$Si-NMR, $^{13}$C-NMR and $^{17}$O-NMR measurement. The modified polysiloxane of this example has no $SiO_{4/2}(Q)$ unit but has a $SiO_{3/2}(T)$ unit.

In all examples described in detail below, analysis was conducted for the presence of a $SiO_{4/2}(Q)$ unit and a $SiO_{3/2}(T)$ unit. Furthermore, if both the $SiO_{4/2}(Q)$ unit and the $SiO_{3/2}(T)$ unit were present, an abundance ratio therebetween was also analyzed. The results are shown in Table 10 below.

The above-described analysis was performed through waveform separation of a measured $^{29}$Si-NMR spectrum. If there is a $SiO_{4/2}(Q)$ unit, a peak appears in the vicinity of −105 ppm to −118 ppm of the spectrum, and if there is $SiO_{3/2}(T)$ unit, a peak appears in the vicinity of −64 ppm to −74 ppm or −94 ppm to −104 ppm. Thus, the presence of these units can be confirmed. Furthermore, a peak area ratio was calculated with respect to such peaks, and the peak area ratio was regarded as the abundance ratio.

Moreover, in Examples 20 to 24, Examples 31 to 33, Example 51, Example 59 and Example 73 in each of which a plurality of metal atoms were included, a bond between each of the metal atoms and an oxygen atom was first confirmed, and a ratio among the bonds of the metal atoms was calculated, so as to regard the ratio as an abundance ratio among the metal atoms.

For example, if silicon (Si) and titanium (Ti) are included as in Example 20, in a measured $^{17}$O-NMR spectrum, a SiOSi structure appears in the vicinity of 0 ppm to −100 ppm, a SiOSi structure appears in the vicinity of −230 ppm to −320 ppm, an $OTi_4$ structure appears in the vicinity of −330 ppm to −400 ppm, an $OTi_3$ structure appears in the vicinity of −480 ppm to −600 ppm, and an $OTi_2$ structure appears in the vicinity of −700 ppm to −800 ppm. Based on areas of these peaks, a ratio among respective bonds is calculated, and this ratio was regarded as an abundance ratio between the respective atoms. Similar calculation was conducted with regard to zirconium (Zr) and hafnium (Hf).

[5-2. Measurement of Electric Resistance Value of Charging Roller]

The electric resistance value of charging roller 1 was measured by the aforementioned method. The electric resistance value attained in this example was $2.0 \times 10^5 \Omega$. The result is shown in Table 5.

[5-3. Evaluation Test for C Set]

As an electrophotographic apparatus having the structure illustrated in FIG. 3, a color laser printer (LBP5400 (trade name)) manufactured by Canon Inc. having been converted to attain an output speed for a recording medium of 200 mm/sec (for vertically outputting A-4 size paper) was used. The resolution of an image was set to 600 dpi, and the primary charging output was a DC voltage of −1100V.

Figure 4:
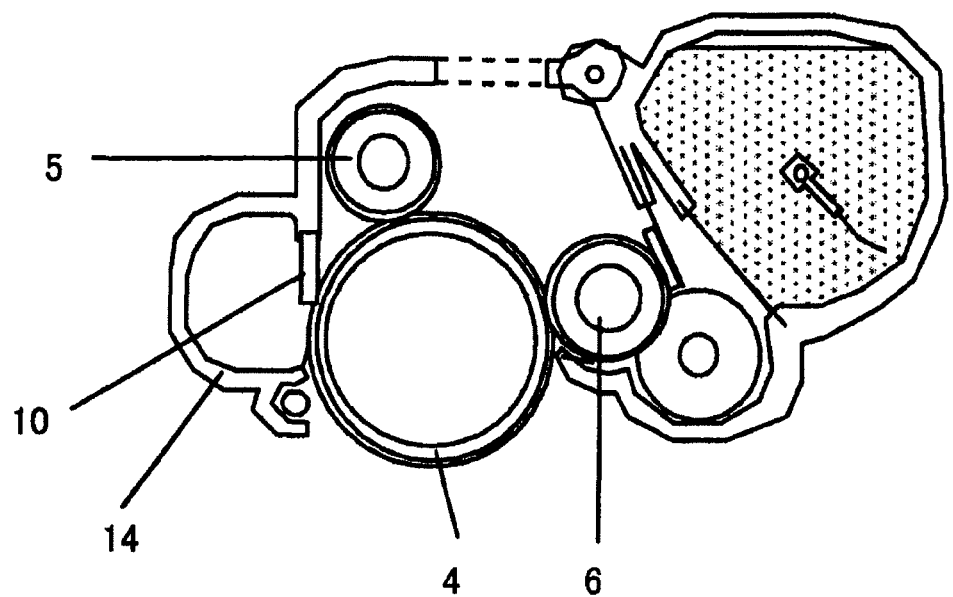
FIG. 4 is a schematic diagram illustrating an example of a cross-section of a process cartridge according to the present invention.
Figure 5:
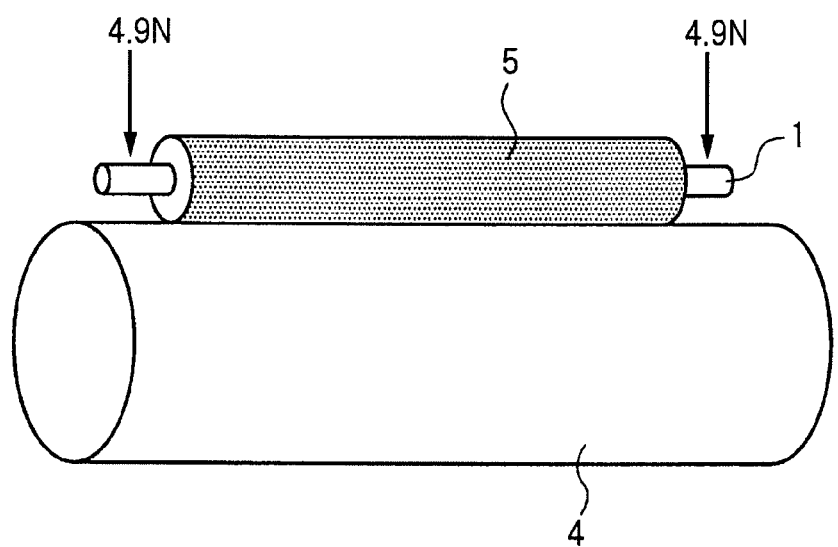
FIG. 5 is a schematic diagram illustrating a contact state between the electrophotographic roller and an electrophotographic photosensitive member according to the present invention.

As a process cartridge having a structure illustrated in FIG. 4, a process cartridge (for black) of the above-described printer was used. An attached charging roller was removed from the process cartridge, and charging roller 1 of this example was set instead. As illustrated in FIG. 5, the charging roller was abutted against a photosensitive member with pressing pressure caused by a spring of 4.9 N on one side, namely, 9.8 N in total on both sides. This process cartridge was left to stand in an environment of a temperature of 40° C. and relative humidity of 95% for 1 month. Next, the process cartridge was left to stand in an environment of a temperature of 23° C. and relative humidity of 50% for 6 hours, and thereafter, the process cartridge was attached to the electrophotographic apparatus, for outputting an image in a similar environment.

The thus output image was evaluated for a C set image. The evaluation result is shown in Table 5. Herein, a C set image was evaluated according to the following standards:
Rank 1: No C set image is caused.
Rank 2: Stripes are slightly formed but cannot be recognized on a cycle of the charging roller.
Rank 3: Stripes can be recognized at a pitch of the charging roller but offer no practical problem.
Rank 4: Stripes are conspicuous.

[5-4. Measurement of Degree of C Set]

After outputting the image, the charging roller was removed from the process cartridge, and the radius of the charging roller was measured in a C set portion and a non-C set portion. A difference in the radius between the non-C set portion and the C set portion corresponds to the degree of C set. For the measurement, a fully automatic roller measurement system available from Tokyo Opto-electronics Co., Ltd. was used.

In three positions, that is, a center position along the lengthwise direction of the charging roller and two positions away from the center position in the lateral direction by 90 mm each, with the charging roller rotated by 1 degree at a time, the radius was measured in positions corresponding to a C set portion and a non-C set portion. Next, a difference between the largest radius obtained in the non-C set portion and the smallest radius obtained in the C set portion was calculated. Among values obtained in the three positions, a largest difference in the radius was regarded as the degree of C set (degree of deformation) of the present invention. The result is shown in Table 5.

[5-5. Measurement of C Set Resistance Difference]

The aforementioned electric resistance measuring apparatus was used for obtaining a difference in the electric resistance value of charging roller 1 between the C set portion and the non-C set portion. The circumferential speed was set to 15 mm/sec. An average electric resistance value obtained in the non-C set portion, the maximum electric resistance value and the minimum electric resistance value obtained in the C set portion were calculated. The maximum electric resistance value or the minimum electric resistance value was divided by the average electric resistance value of the non-C set portion, and the electric resistance value having a larger difference from 1 was regarded as a C set resistance difference of the present invention. The resistance difference of this invention was 0.9. The result is shown in Table 5.

Example 2

Charging roller 2 was produced in the same manner as in Example 1 except that 2 parts by mass of a compound represented by the following formula (A-2) was used instead of the compound represented by the formula (A-1) as the metal alkoxide B. It is noted that terms of "parts by mass" shown in Table 5 mean parts by mass based on 100 parts by mass of the polyurethane.

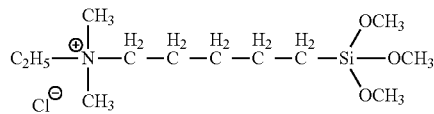
(A-2)

Example 3

Charging roller 3 was produced in the same manner as in Example 1 except that 5 parts by mass of a compound represented by the following formula (A-3) was used instead of the compound represented by the formula (A-1) as the metal alkoxide B.

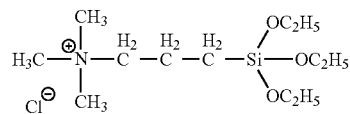
(A-3)

Example 4

Charging roller 4 was produced in the same manner as in Example 1 except that surface layer forming coating solution A-1 was replaced with surface layer forming coating solution A-4 prepared as follows.

[Preparation of Surface Layer Forming Coating Solution A-4]

A conductive resin solution was prepared by mixing 333 parts by mass of polyurethane solution 2 prepared in Production Example 2, 167 parts by mass of methyl ethyl ketone, 15 parts by mass of tetramethoxysilane (trade name: MS51, manufactured by Tama Chemicals Co., Ltd.), 1.36 parts by mass of a 10% paratoluene sulfonic acid aqueous solution and 10 parts by mass of a compound represented by the following formula (A-4) and stirring the resultant mixture. Thereafter, similar procedures to those of Example 1 were conducted for preparing surface layer forming coating solution A-4.

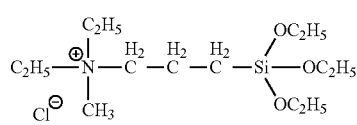
(A-4)

Example 5

Charging roller 5 was produced in the same manner as in Example 4 except that the tetramethoxysilane was replaced with 25 parts by mass of tetraethoxysilane (trade name: Dynasil A, manufactured by Huls A.G.) and that 5 parts by mass of a compound represented by the following formula (A-5) was used instead of the compound represented by the formula (A-4) as the metal alkoxide B.

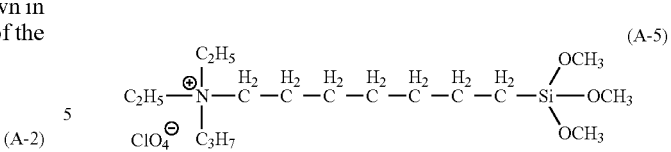
(A-5)

Example 6 and Example 7

Charging rollers 6 and 7 were produced in the same manner as in Example 4 except that the kind and content of the metal alkoxide B were changed to those shown in Table 5.

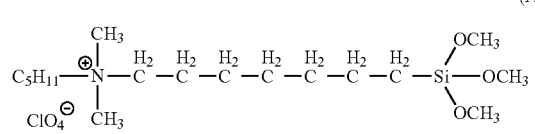
(A-6)

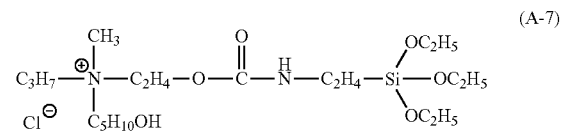
(A-7)

Examples 8 to 11

Charging rollers 8 to 11 were produced in the same manner as in Example 1 except that the kind and content of the metal alkoxide B were changed to those shown in Table 5.

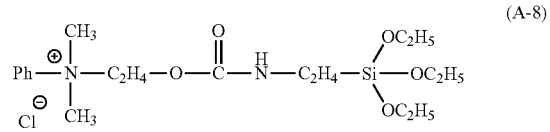
(A-8)

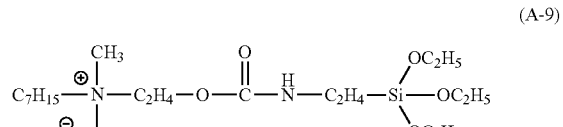
(A-9)

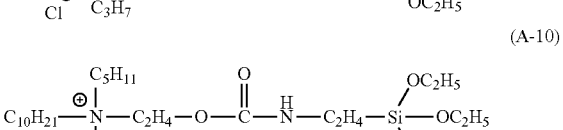
(A-10)

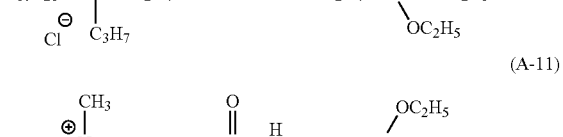
(A-11)

Example 12

[1. Production of Conductive Elastic Roller D-12]

Conductive elastic roller D-12 was produced in the same manner as conductive elastic roller D-1 except that conductive rubber composition 1 used in Example 1 was replaced with conductive rubber composition 2 prepared in Production Example 14.

[2. Preparation of Surface Layer Forming Coating Solution A-12]

A reactor vessel was charged with 100 parts by mass of polyurethane solution 3 prepared in Production Example 3, 4 parts by mass of tetramethoxysilane (trade name: MS51, manufactured by Tama Chemicals Co., Ltd.) and 0.05 part by mass of dibutyl laurate, and the thus obtained mixture was stirred at 60° C. for 3 hours. After stirring, the resultant mixture was cooled, and 5 parts by mass of dimethylformamide, 5 parts by mass of the compound represented by the formula (A-1) and 5 parts by mass of a compound represented by the following formula (A-12) were further added thereto, and the resultant mixture was stirred, so as to prepare a conductive resin solution. After adjusting the content of a solid component in this solution to 20 mass %, similar procedures to those of Example 1 were conducted for preparing surface layer forming coating solution A-12.

[3. Formation of Conductive Surface Layer]

Charging roller 12 was produced in the same manner as in Example 1 except that conductive elastic roller D-1 was replaced with conductive elastic roller D-12 and that surface layer forming coating solution A-1 was replaced with surface layer forming coating solution A-12.

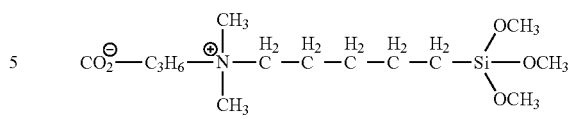

(A-12)

Example 13

Charging roller 13 was produced in the same manner as in Example 12 except that the kind and content of the metal alkoxide B were changed to those shown in Table 5.

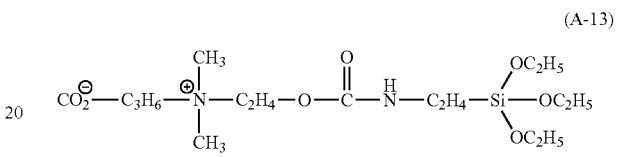

(A-13)

Examples 14 to 17

Charging rollers 14 to 17 were produced in the same manner as in Example 13 except that the kind and content of the metal alkoxide B were changed to those shown in Table 5.

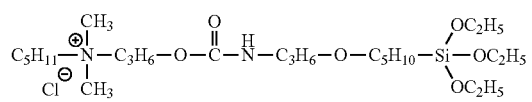

(A-14)

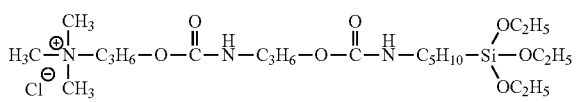

(A-15)

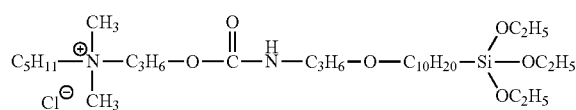

(A-16)

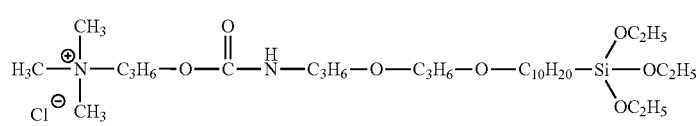

(A-17)

Examples 18 and 19

Charging rollers 18 and 19 were produced in the same manner as in Example 1 except that the kind and content of the metal alkoxide B were changed to those shown in Table 5.

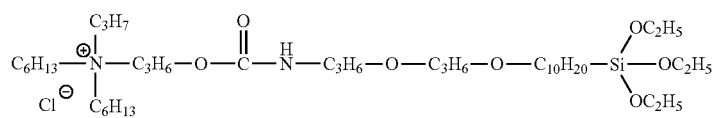

(A-18)

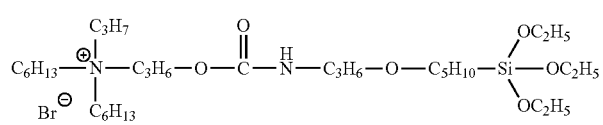

(A-19)

Example 20

Charging roller 20 was produced in the same manner as in Example 1 except that surface layer forming coating solution A-1 was replaced with surface layer forming coating solution A-20 prepared as follows.

[Preparation of Surface Layer Forming Coating Solution A-20]

A conductive resin solution was prepared by mixing 333 parts by mass of polyurethane solution 2 prepared in Production Example 2, 167 parts by mass of methyl ethyl ketone, 10 parts by mass of tetramethoxysilane (trade name: MS51, manufactured by Tama Chemicals Co., Ltd.), 10 parts by mass of tetraisopropoxy titanium (manufactured by Kojundo Chemical Laboratory Co., Ltd.), 1.36 parts by mass of a 10% paratoluene sulfonic acid aqueous solution and 2 parts by mass of the compound represented by the formula (A-2) and stirring the resultant mixture. Thereafter, similar procedures to those of Example 1 were conducted for preparing surface layer forming coating solution A-20.

Examples 21 and 22

Charging rollers 21 and 22 were produced in the same manner as in Example 20 except that the kind and content of the metal alkoxide B were changed to those shown in Table 5.

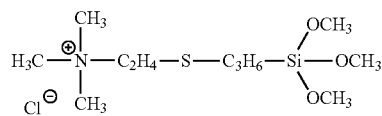
(A-22)

Examples 23 and 24

Charging rollers 23 and 24 were produced in the same manner as in Example 22 except that the tetraisopropoxy titanium was replaced with tetraethoxy zirconium (in Example 23) and tetraethoxy hafnium (in Example 24).

Example 25

Charging roller 25 was produced in the same manner as in Example 1 except that surface layer forming coating solution A-1 was replaced with surface layer forming coating solution A-25 prepared as follows.

[Preparation of Surface Layer Forming Coating Solution A-25]

A conductive resin solution was prepared by mixing 333 parts by mass of polyurethane solution 4 prepared in Production Example 4, 167 parts by mass of methyl ethyl ketone, 20 parts by mass of tetramethoxysilane (trade name: MS51, manufactured by Tama Chemicals Co., Ltd.), 1.36 parts by mass of a 10% paratoluene sulfonic acid aqueous solution and 3 parts by mass of a compound represented by the following formula (A-25) and stirring the resultant mixture. Thereafter, similar procedures to those of Example 1 were conducted for preparing surface layer forming coating solution A-25.

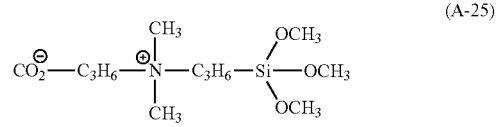
(A-25)

Examples 26 and 27

Charging rollers 26 and 27 were produced in the same manner as in Example 25 except that the kind and content of the metal alkoxide B were changed to those shown in Table 5.

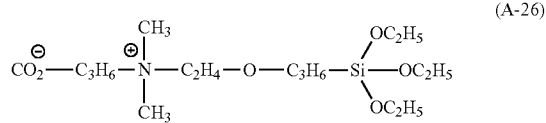
(A-26)

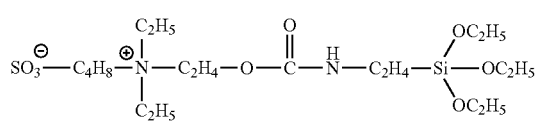
(A-27)

Example 28

Charging roller 28 was produced in the same manner as in Example 25 except that surface layer forming coating solution A-25 used in Example 25 was replaced with surface layer forming coating solution A-28 prepared as follows.

[Preparation of Surface Layer Forming Coating Solution A-28]

A conductive resin solution was prepared by mixing 333 parts by mass of polyurethane solution 8 prepared in Production Example 8, 167 parts by mass of methyl ethyl ketone, 20 parts by mass of tetramethoxysilane (trade name: MS51, manufactured by Tama Chemicals Co., Ltd.), 1.36 parts by mass of a 10% paratoluene sulfonic acid aqueous solution and 5 parts by mass of a compound represented by the following formula (A-28) and stirring the resultant mixture. Thereafter, similar procedures to those of Example 1 were conducted for preparing surface layer forming coating solution A-28.

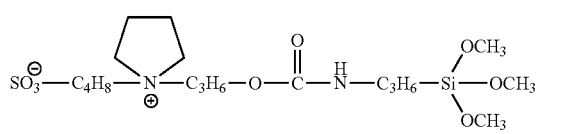
(A-28)

Examples 29 and 30

Charging rollers 29 and 30 were produced in the same manner as in Example 28 except that the kind and content of the metal alkoxide B were changed to those shown in Table 5.

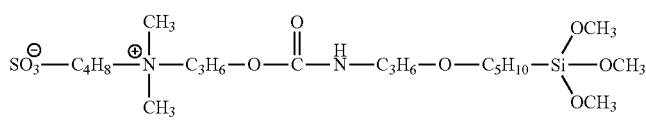
(A-29)

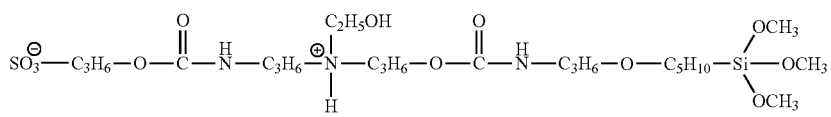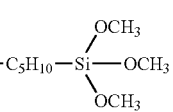
(A-30)

Example 31

Charging roller 31 was produced in the same manner as in Example 26 except that 20 parts by mass of tetramethoxysilane was replaced with 10 parts by mass of tetramethoxysilane and 10 parts by mass of tetraisopropoxy titanium (manufactured by Kojundo Chemical Laboratory Co., Ltd.) and that the amount of the compound represented by the formula (A-26) was changed to 5 parts by mass.

Examples 32 and 33

Charging rollers 32 and 33 were produced in the same manner as in Example 31 except that the tetraisopropoxy titanium was replaced with tetraethoxy zirconium (in Example 32) or tetraethoxy hafnium (in Example 33).

Example 34

Charging roller 34 was produced in the same manner as in Example 25 except that surface layer forming coating solution A-25 was replaced with surface layer forming coating solution A-34 prepared as follows.

[Preparation of Surface Layer Forming Coating Solution A-34]

A conductive resin solution was prepared by mixing 333 parts by mass of polyurethane solution 5 prepared in Production Example 5, 167 parts by mass of methyl ethyl ketone, 20 parts by mass of tetraethoxysilane (trade name: MS51, manufactured by Tama Chemicals Co., Ltd.), 1.5 parts by mass of a 10% paratoluene sulfonic acid aqueous solution and 5 parts by mass of the compound represented by the formula (A-3) and stirring the resultant mixture. Thereafter, similar procedures to those of Example 1 were conducted for preparing surface layer forming coating solution A-34.

Examples 35 and 36

Charging rollers 35 and 36 were produced in the same manner as in Example 34 except that the kind and content of the metal alkoxide B were changed to those shown in Table 5.

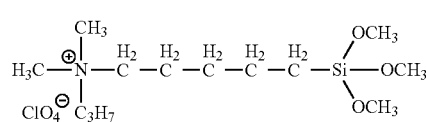
(A-35)

-continued

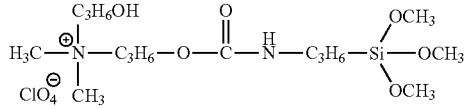
(A-36)

Example 37

Charging roller 37 was produced in the same manner as in Example 1 except that surface layer forming coating solution A-1 was replaced with surface layer forming coating solution A-37 prepared as follows.

[Preparation of Surface Layer Forming Coating Solution A-37]

Surface layer forming coating solution A-37 was prepared in the same manner as in Example 1 except that the amount of epoxy group-containing alkoxysilane 1 added in the preparation of surface layer forming coating solution A-1 was changed to 50 parts by mass.

Examples 38 and 39

Charging rollers 38 and 39 were produced in the same manner as in Example 1 except that the kind and content of the metal alkoxide B were changed to those shown in Table 5.

Example 40

Charging roller 40 was produced in the same manner as in Example 34 except that surface layer forming coating solution A-34 was replaced with surface layer forming coating solution A-40 prepared as follows.

[Preparation of Surface Layer Forming Coating Solution A-40]

A conductive resin solution was prepared by mixing 500 parts by mass of polyurethane solution 6 prepared in Production Example 6, 20 parts by mass of tetraethoxysilane (trade name: MS51, manufactured by Tama Chemicals Co., Ltd.), 1.5 parts by mass of a 10% paratoluene sulfonic acid aqueous solution and 5 parts by mass of the compound represented by the formula (A-1) and stirring the resultant mixture. Thereafter, similar procedures to those of Example 1 were conducted for preparing surface layer forming coating solution A-40.

Examples 41 to 44

Charging rollers 41 to 44 were produced in the same manner as in Example 40 except that the kind and content of the metal alkoxide B were changed to those shown in Table 5.

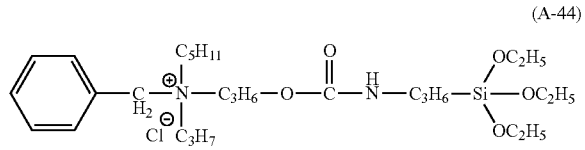

(A-44)

Example 45

A charging roller 45 was produced in the same manner as in Example 1 except that surface layer forming coating solution A-1 was replaced with surface layer forming coating solution A-45 prepared as follows.

[Preparation of Surface Layer Forming Coating Solution A-45]

A conductive resin solution was prepared by mixing 500 parts by mass of polyamide solution 1 prepared in Production Example 11, 200 parts by mass of acetone, 20 parts by mass of tetramethoxysilane (trade name: MS51, manufactured by Tama Chemicals Co., Ltd.), 1.36 parts by mass of a 10% paratoluene sulfonic acid aqueous solution and 5 parts by mass of the compound represented by the formula (A-3) and stirring the resultant mixture. Thereafter, similar procedures to those of Example 1 were conducted for preparing surface layer forming coating solution A-45.

Examples 46 to 50

Charging rollers 46 to 50 were produced in the same manner as in Example 45 except that the kind and content of the metal alkoxide B were changed to those shown in Table 6.

(A-48)

(A-49)

(A-50)

Example 51

Charging roller 51 was produced in the same manner as in Example 46 except that 20 parts by mass of tetramethoxysilane was replaced with 10 parts by mass of tetramethoxysilane and 10 parts by mass of tetraisopropoxy titanium (manufactured by Kojundo Chemical Laboratory Co., Ltd.) and that the compound represented by the formula (A-35) was replaced with the compound represented by the formula (A-36).

Example 52

Charging roller 52 was produced in the same manner as in Example 45 except that conductive elastic roller D-1 was replaced with conductive elastic roller D-12 and that surface layer forming coating solution A-45 was replaced with surface layer forming coating solution A-52 prepared as follows.

[Preparation of Surface Layer Forming Coating Solution A-52]

Surface layer forming coating solution A-52 was prepared in the same manner as in Example 45 except that polyamide solution 1 was replaced with polyamide solution 2.

Examples 53 to 55

Charging rollers 53 to 55 were produced in the same manner as in Example 52 except that the kind and content of the metal alkoxide B were changed to those shown in Table 6.

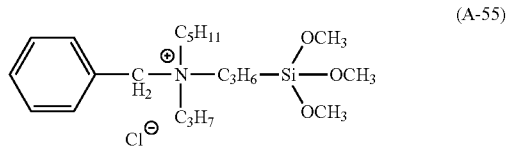

(A-55)

Example 56

Charging roller 56 was produced in the same manner as in Example 52 except that surface layer forming coating solution A-52 was replaced with surface layer forming coating solution A-56 prepared as follows.

[Preparation of Surface Layer Forming Coating Solution A-56]

Five hundred parts by mass of polyamide solution 9 prepared in Production Example 9, 200 parts by mass of acetone, 10 parts by mass of epoxy group-containing alkoxysilane 1 (prepared in Production Example 10) and 1.36 parts by mass of a 10% paratoluene sulfonic acid aqueous solution were mixed and stirred. A reaction was conducted at 60° C. for 4 hours in a nitrogen atmosphere, and thereafter, 5 parts by mass of the compound represented by the formula (A-25) was added thereto. Subsequently, the reaction was further conducted for 2 hours in a nitrogen atmosphere, so as to obtain a conductive resin solution. Thereafter, similar procedures to those of Example 1 were conducted for preparing surface layer forming coating solution A-56.

Examples 57 and 58

Charging rollers 57 and 58 were produced in the same manner as in Example 56 except that the kind and content of the metal alkoxide B were changed to those shown in Table 6.

Example 59

Charging roller 59 was produced in the same manner as in Example 45 except that 20 parts by mass of tetramethoxysilane was replaced with 10 parts by mass of tetramethoxysi-

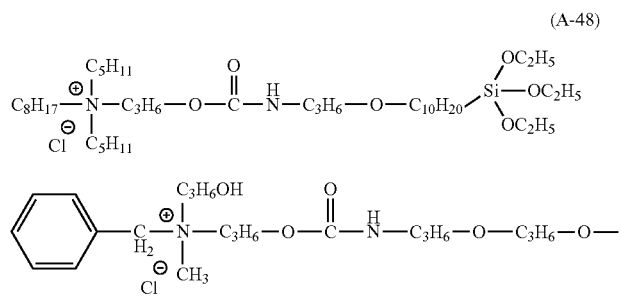

lane and 10 parts by mass of tetraisopropoxy titanium (manufactured by Kojundo Chemical Laboratory Co., Ltd.) and that the kind and content of the metal alkoxide B were changed to those shown in Table 6.

Examples 60 to 63

Charging rollers 60 to 63 were produced in the same manner as in Example 45 except that the kind and content of the metal alkoxide B were changed to those shown in Table 6.

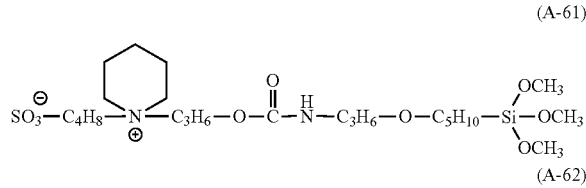

Example 64

A charging roller 64 was produced in the same manner as in Example 1 except that surface layer forming coating solution A-1 was replaced with surface layer forming coating solution A-64 prepared as follows.

[Preparation of Surface Layer Forming Coating Solution A-64]

To 333 parts by mass of polyurethane solution 3 prepared in Production Example 3, 30 parts by mass of 3-isocyanate propyltriethoxysilane was added, and a reaction was conducted at 70° C. in a nitrogen atmosphere for 6 hours. Thereafter, 5 parts by mass of the metal alkoxide represented by the formula (A-1) was added thereto. Subsequently, the reaction was further conducted in a nitrogen atmosphere for 2 hours, so as to obtain a conductive resin solution. Thereafter, similar procedures to those of Example 1 were conducted for preparing surface layer forming coating solution A-64.

Examples 65 and 66

Charging rollers 65 and 66 were produced in the same manner as in Example 64 except that the kind and content of the metal alkoxide B were changed to those shown in Table 6.

Example 67

Charging roller 67 was produced in the same manner as in Example 40 except that surface layer forming coating solution A-40 was replaced with surface layer forming coating solution A-67 prepared as follows.

[Preparation of Surface Layer Forming Coating Solution A-67]

Surface layer forming coating solution A-67 was prepared in the same manner as in Example 40 except that polyurethane solution 6 was replaced with polyurethane solution 9.

Example 68

A charging roller 68 was produced in the same manner as in Example 67 except that the kind and content of the metal alkoxide B were changed to those shown in Table 6.

Example 69

Charging roller 69 was produced in the same manner as in Example 68 except that the teteraethoxysilane was replaced with tetraisopropoxy titanium (manufactured by Kojundo Chemical Laboratory Co., Ltd.).

Example 70

Charging roller 70 was produced in the same manner as in Example 67 except that surface layer forming coating solution A-67 was replaced with surface layer forming coating solution A-70 prepared as follows.

[Preparation of Surface Layer Forming Coating Solution A-70]

Surface layer forming coating solution A-70 was prepared in the same manner as in Example 67 except that polyurethane solution 9 was replaced with polyurethane solution 7.

Examples 71 to 73

Charging rollers 71 to 73 were produced in the same manner as in Example 70 except that the kind and content of the metal alkoxide B were changed to those shown in Table 6.

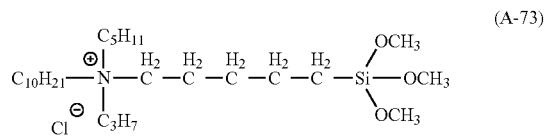

Example 74

Charging roller 74 was produced in the same manner as in Example 1 except that the crosslinked polymethyl methacrylate particles were not added in preparing a surface layer forming coating solution.

Comparative Example 1

Charging roller 75 was produced in the same manner as in Example 74 except that 5 parts by mass of a compound represented by the following formula (B-1) was added instead of the compound represented by the formula (A-1) in preparing a surface layer forming coating solution.

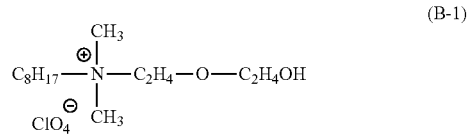

Comparative Example 2

Charging roller 76 was produced in the same manner as in Comparative Example 1 except that 5 parts by mass of a compound represented by the following formula (B-2) was added instead of the compound represented by the formula (B-1) in preparing a surface layer forming coating solution.

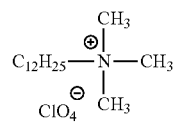

(B-2)

Comparative Example 3

Charging roller 77 was produced in the same manner as in Example 55 except that 2 parts by mass of the compound represented by the formula (B-1) was added instead of the compound represented by the formula (A-55) in preparing a surface layer forming coating solution.

Comparative Example 4

Charging roller 78 was produced in the same manner as in Comparative Example 1 except that epoxy group-containing alkoxysilane 1 was not added.

Comparative Example 5

Charging roller 79 was produced in the same manner as in Comparative Example 3 except that the tetramethoxysilane was not added.

Comparative Example 6

Charging roller 80 was produced in the same manner as in Comparative Example 5 except that the compound represented by the formula (B-1) was not added.

TABLE 5

|  |  | Metal alkoxide B with structure of formula (4) | parts by mass | Metal alkoxide B with structure of formula (5) | parts by mass | Roller resistance (Ω) | Resistance difference | Degree of deformation (μm) | Rank of image |
|---|---|---|---|---|---|---|---|---|---|
| Example | 1 | (A-1) | 5 | — | — | $2.0 \times 10^5$ | 0.9 | 8 | 1 |
|  | 2 | (A-2) | 2 | — | — | $5.0 \times 10^5$ | 1.2 | 8 | 2 |
|  | 3 | (A-3) | 5 | — | — | $2.3 \times 10^5$ | 1.1 | 9 | 2 |
|  | 4 | (A-4) | 10 | — | — | $1.2 \times 10^5$ | 0.9 | 9 | 1 |
|  | 5 | (A-5) | 5 | — | — | $2.5 \times 10^5$ | 1 | 8 | 1 |
|  | 6 | (A-6) | 5 | — | — | $2.3 \times 10^5$ | 1.1 | 8 | 1 |
|  | 7 | (A-7) | 5 | — | — | $2.1 \times 10^5$ | 1.1 | 9 | 1 |
|  | 8 | (A-8) | 5 | — | — | $3.4 \times 10^5$ | 0.7 | 10 | 3 |
|  | 9 | (A-9) | 5 | — | — | $4.3 \times 10^5$ | 1.3 | 9 | 3 |
|  | 10 | (A-10) | 5 | — | — | $2.5 \times 10^5$ | 1.3 | 10 | 3 |
|  | 11 | (A-11) | 5 | — | — | $2.8 \times 10^5$ | 1.1 | 8 | 1 |
|  | 12 | (A-1) | 5 | (A-12) | 5 | $1.8 \times 10^5$ | 1.1 | 7 | 1 |
|  | 13 | (A-1) | 5 | (A-13) | 5 | $2.5 \times 10^5$ | 1.2 | 9 | 1 |
|  | 14 | (A-14) | 5 | — | — | $2.4 \times 10^5$ | 1.1 | 8 | 1 |
|  | 15 | (A-15) | 5 | — | — | $2.9 \times 10^5$ | 0.9 | 7 | 1 |
|  | 16 | (A-16) | 5 | — | — | $3.0 \times 10^5$ | 1.1 | 8 | 1 |
|  | 17 | (A-17) | 5 | — | — | $2.0 \times 10^5$ | 0.9 | 7 | 1 |
| Example | 18 | (A-18) | 5 | — | — | $4.5 \times 10^5$ | 0.7 | 10 | 3 |
|  | 19 | (A-19) | 5 | — | — | $4.3 \times 10^5$ | 0.8 | 9 | 2 |
|  | 20 | (A-2) | 2 | — | — | $2.3 \times 10^5$ | 0.8 | 8 | 2 |
|  | 21 | (A-4) | 10 | — | — | $1.4 \times 10^5$ | 0.9 | 8 | 1 |
|  | 22 | (A-22) | 5 | — | — | $2.6 \times 10^5$ | 1.1 | 7 | 1 |
|  | 23 | (A-22) | 5 | — | — | $2.3 \times 10^5$ | 1.1 | 8 | 1 |
|  | 24 | (A-22) | 5 | — | — | $1.2 \times 10^5$ | 0.9 | 7 | 1 |
|  | 25 | — | — | (A-25) | 3 | $5.5 \times 10^5$ | 0.8 | 9 | 2 |
|  | 26 | — | — | (A-26) | 10 | $2.5 \times 10^5$ | 1.1 | 8 | 1 |
|  | 27 | — | — | (A-27) | 5 | $3.5 \times 10^5$ | 1.1 | 8 | 1 |
|  | 28 | — | — | (A-28) | 5 | $3.2 \times 10^5$ | 1 | 8 | 1 |
|  | 29 | — | — | (A-29) | 10 | $2.0 \times 10^5$ | 1 | 8 | 1 |
|  | 30 | — | — | (A-30) | 5 | $2.6 \times 10^5$ | 1.2 | 8 | 2 |
|  | 31 | — | — | (A-26) | 5 | $2.3 \times 10^5$ | 1.1 | 8 | 1 |
|  | 32 | — | — | (A-26) | 5 | $2.6 \times 10^5$ | 1.1 | 8 | 1 |
|  | 33 | — | — | (A-26) | 5 | $2.8 \times 10^5$ | 1.1 | 8 | 1 |
|  | 34 | (A-3) | 5 | — | — | $1.2 \times 10^5$ | 0.8 | 9 | 2 |
|  | 35 | (A-35) | 5 | — | — | $1.8 \times 10^5$ | 0.9 | 9 | 1 |
| Example | 36 | (A-36) | 5 | — | — | $1.9 \times 10^5$ | 0.9 | 9 | 1 |
|  | 37 | (A-1) | 5 | — | — | $2.0 \times 10^5$ | 1.1 | 8 | 1 |
|  | 38 | (A-2) | 2 | — | — | $2.6 \times 10^5$ | 1.2 | 8 | 2 |
|  | 39 | (A-4) | 10 | — | — | $2.3 \times 10^5$ | 1.1 | 8 | 1 |
|  | 40 | (A-1) | 5 | — | — | $1.1 \times 10^5$ | 1 | 9 | 1 |
|  | 41 | (A-2) | 1 | — | — | $1.2 \times 10^5$ | 0.7 | 10 | 3 |
|  | 42 | (A-4) | 10 | — | — | $9.8 \times 10^4$ | 0.8 | 9 | 2 |
|  | 43 | (A-11) | 5 | — | — | $1.2 \times 10^5$ | 0.9 | 9 | 1 |
|  | 44 | (A-44) | 10 | — | — | $9.5 \times 10^4$ | 0.7 | 9 | 3 |
|  | 45 | (A-3) | 5 | — | — | $2.3 \times 10^5$ | 0.8 | 9 | 2 |

TABLE 6

| | | Metal alkoxide B with structure of formula (4) | parts by mass | Metal alkoxide B with structure of formula (5) | parts by mass | Roller resistance (Ω) | Resistance difference | Degree of deformation (μm) | Rank of image |
|---|---|---|---|---|---|---|---|---|---|
| Example | 46 | (A-35) | 5 | — | — | $2.4 \times 10^5$ | 0.9 | 8 | 1 |
| | 47 | (A-36) | 5 | — | — | $2.6 \times 10^5$ | 0.9 | 8 | 1 |
| | 48 | (A-48) | 5 | — | — | $3.6 \times 10^5$ | 1.3 | 10 | 3 |
| | 49 | (A-49) | 5 | — | — | $2.5 \times 10^5$ | 1.2 | 9 | 2 |
| | 50 | (A-50) | 5 | — | — | $2.9 \times 10^5$ | 1 | 8 | 1 |
| | 51 | (A-36) | 5 | — | — | $2.6 \times 10^5$ | 1 | 8 | 1 |
| | 52 | (A-3) | 5 | — | — | $3.6 \times 10^5$ | 1.2 | 8 | 2 |
| | 53 | (A-35) | 5 | — | — | $3.3 \times 10^5$ | 0.9 | 8 | 1 |
| | 54 | (A-36) | 5 | — | — | $3.2 \times 10^5$ | 0.9 | 8 | 1 |
| | 55 | (A-55) | 2 | — | — | $4.6 \times 10^5$ | 0.7 | 10 | 3 |
| | 56 | — | — | (A-25) | 5 | $3.6 \times 10^5$ | 1.2 | 9 | 2 |
| | 57 | — | — | (A-26) | 5 | $3.0 \times 10^5$ | 1.1 | 8 | 1 |
| | 58 | — | — | (A-27) | 5 | $2.8 \times 10^5$ | 1.1 | 8 | 1 |
| | 59 | (A-1) | 5 | (A-27) | 5 | $3.7 \times 10^5$ | 1.1 | 8 | 1 |
| | 60 | — | — | (A-28) | 5 | $3.6 \times 10^5$ | 0.9 | 8 | 1 |
| | 61 | — | — | (A-61) | 5 | $2.5 \times 10^5$ | 1.1 | 8 | 1 |
| Example | 62 | — | — | (A-62) | 5 | $3.9 \times 10^5$ | 1.2 | 8 | 2 |
| | 63 | (A-1) | 5 | (A-62) | 5 | $3.5 \times 10^5$ | 1.2 | 8 | 2 |
| | 64 | (A-1) | 5 | — | — | $2.0 \times 10^5$ | 1 | 9 | 1 |
| | 65 | (A-2) | 2 | — | — | $2.9 \times 10^5$ | 1 | 9 | 1 |
| | 66 | (A-4) | 10 | (A-26) | 5 | $2.5 \times 10^5$ | 1.1 | 9 | 1 |
| | 67 | (A-1) | 5 | — | — | $3.2 \times 10^5$ | 1.2 | 10 | 2 |
| | 68 | (A-2) | 1 | — | — | $2.9 \times 10^5$ | 1.3 | 10 | 3 |
| | 69 | (A-4) | 10 | — | — | $3.9 \times 10^5$ | 1.2 | 10 | 2 |
| | 70 | (A-1) | 5 | (A-26) | 5 | $2.1 \times 10^5$ | 1 | 9 | 1 |
| | 71 | (A-2) | 1 | — | — | $2.3 \times 10^5$ | 1.2 | 9 | 2 |
| | 72 | (A-4) | 10 | — | — | $2.5 \times 10^5$ | 1.1 | 9 | 1 |
| | 73 | (A-73) | 2 | (A-62) | 10 | $2.2 \times 10^5$ | 1.2 | 9 | 2 |
| | 74 | (A-1) | 5 | — | — | $2.6 \times 10^5$ | 1.1 | 10 | 1 |
| Comparative Example | 1 | — | — | — | — | $2.2 \times 10^7$ | 0.4 | 13 | 4 |
| | 2 | — | — | — | — | $2.6 \times 10^5$ | 0.3 | 13 | 4 |
| | 3 | — | — | — | — | $3.6 \times 10^5$ | 0.4 | 13 | 4 |
| | 4 | — | — | — | — | $2.6 \times 10^5$ | 0.4 | 18 | 4 |
| | 5 | — | — | — | — | $2.2 \times 10^5$ | 0.4 | 18 | 4 |
| | 6 | — | — | — | — | $4.2 \times 10^7$ | 1.6 | 16 | 4 |

TABLE 7

Examples 1-3 (C-1)

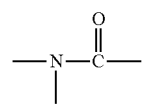

Examples 4-7 (C-2)

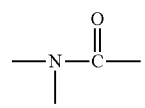

TABLE 7-continued

Examples 8-11 (C-1)

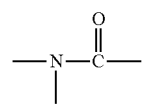

Examples 12-17 (C-2)

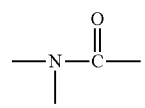

TABLE 7-continued

| Examples | Structure | Type |
|---|---|---|
| Examples 18, 19 | —N(—)—C(=O)—, N-CH₂-CH(OH)-CH₂-O- | (C-1) |
| Examples 20-22 | —N(—)—C(=O)— | (C-2) |
| Examples 23 | —N(—)—C(=O)— | (C-2) |
| Examples 24 | —N(—)—C(=O)— | (C-2) |
| Examples 25-27 | —N(—)—C(=O)— | (C-2) |
| Examples 28-30 | —N(—)—C(=O)—, N-CH₂-CH(OH)-CH₂-O- | (C-1) |

TABLE 8

| Examples | Structure | Type |
|---|---|---|
| Examples 31 | —N(—)—C(=O)— | (C-2) |

TABLE 8-continued

| Examples | Structure | Type |
|---|---|---|
| Examples 32 | —N(—)—C(=O)— | (C-2) |
| Examples 33 | —N(—)—C(=O)— | (C-2) |
| Examples 34-36 | —N(—)—C(=O)— | (C-2) |
| Examples 37-39 | —N(—)—C(=O)—, N-CH₂-CH(OH)-CH₂-O- | (C-1) |
| Examples 40-44 | —N(—)—C(=O)— | (C-2) |
| Examples 45-55 | —C(=O)—N(—)—CH₂—CH₂— | (C-4) |
| Examples 56-59 | —C(=O)—N(—(CH₂)₂—)—, N-CH₂-CH(OH)-CH₂-O- | (C-5) |
| Examples 60-63 | —C(=O)—N(—)—CH₂—CH₂— | (C-4) |

TABLE 8-continued

Examples 64-66 (C-6)

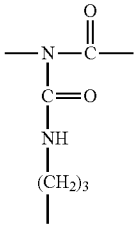

TABLE 9

Examples 67-69 (C-2)

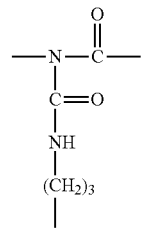

TABLE 9-continued

Examples 70-73 (C-6)

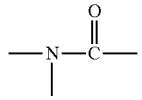

Examples 74 (C-1)

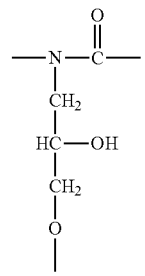

TABLE 10

| | | $SiO_{3/2}$(T) unit | $SiO_{4/2}$(Q) unit | [T unit]/ [Q unit] | Metal atomic species | [Ti + Zr + Hf]/Si |
|---|---|---|---|---|---|---|
| Example | 1 | included | not included | — | Si | — |
| | 2 | included | not included | — | Si | — |
| | 3 | included | not included | — | Si | — |
| | 4 | included | included | 0.95 | Si | — |
| | 5 | included | included | 0.96 | Si | — |
| | 6 | included | included | 0.97 | Si | — |
| | 7 | included | included | 0.98 | Si | — |
| | 8 | included | not included | — | Si | — |
| | 9 | included | not included | — | Si | — |
| | 10 | included | not included | — | Si | — |
| | 11 | included | not included | — | Si | — |
| | 12 | included | included | 0.95 | Si | — |
| | 13 | included | included | 0.97 | Si | — |
| | 14 | included | included | 0.98 | Si | — |
| | 15 | included | included | 0.98 | Si | — |
| | 16 | included | included | 0.97 | Si | — |
| | 17 | included | included | 0.98 | Si | — |
| | 18 | included | not included | — | Si | — |
| | 19 | included | not included | — | Si | — |
| | 20 | included | included | 0.95 | Si, Ti | 0.80 |
| Example | 21 | included | included | 0.96 | Si, Ti | 0.45 |
| | 22 | included | included | 0.95 | Si, Ti | 0.72 |
| | 23 | included | included | 1.0 | Si, Zr | 0.62 |
| | 24 | included | included | 1.0 | Si, Hf | 0.61 |
| | 25 | included | included | 0.99 | Si | — |
| | 26 | included | included | 0.97 | Si | — |
| | 27 | included | included | 1.0 | Si | — |
| | 28 | included | included | 0.98 | Si | — |
| | 29 | included | included | 1.0 | Si | — |
| | 30 | included | included | 0.97 | Si | — |
| | 31 | included | included | 1.0 | Si, Ti | 0.71 |
| | 32 | included | included | 1.0 | Si, Zr | 0.62 |
| | 33 | included | included | 0.99 | Si, Hf | 0.61 |
| | 34 | included | included | 0.99 | Si | — |
| | 35 | included | included | 0.95 | Si | — |
| | 36 | included | included | 0.99 | Si | — |
| | 37 | included | not included | — | Si | — |
| | 38 | included | not included | — | Si | — |
| | 39 | included | not included | — | Si | — |

TABLE 10-continued

|    | SiO$_{3/2}$(T) unit | SiO$_{4/2}$(Q) unit | [T unit]/ [Q unit] | Metal atomic species | [Ti + Zr + Hf]/Si |
|----|---------------------|---------------------|--------------------|----------------------|-------------------|
| 40 | included | included | 1.0  | Si | — |
| 41 | included | included | 0.99 | Si | — |
| 42 | included | included | 0.98 | Si | — |
| 43 | included | included | 0.99 | Si | — |
| 44 | included | included | 1.0  | Si | — |
| 45 | included | included | 1.0  | Si | — |

TABLE 11

| | | SiO$_{3/2}$(T) unit | SiO$_{4/2}$(Q) unit | [T unit]/ [Q unit] | Metal atomic species | [Ti + Zr + Hf]/ Si |
|---|---|---|---|---|---|---|
| Example | 46 | included | included | 1.0 | Si | — |
| | 47 | included | included | 1.0 | Si | — |
| | 48 | included | included | 1.0 | Si | — |
| | 49 | included | included | 1.0 | Si | — |
| | 50 | included | included | 1.1 | Si | — |
| | 51 | included | included | 0.98 | Si, Ti | 0.73 |
| | 52 | included | included | 1.0 | Si | — |
| | 53 | included | included | 0.99 | Si | — |
| | 54 | included | included | 1.0 | Si | — |
| | 55 | included | included | 1.0 | Si | — |
| | 56 | included | not included | — | Si | — |
| | 57 | included | not included | — | Si | — |
| | 58 | included | not included | — | Si | — |
| | 59 | included | included | 1.0 | Si, Ti | 0.72 |
| | 60 | included | included | 1.0 | Si | — |
| | 61 | included | included | 1.0 | Si | — |
| | 62 | included | included | 1.1 | Si | — |
| | 63 | included | included | 1.1 | Si | — |
| | 64 | included | not included | — | Si | — |
| | 65 | included | not included | — | Si | — |
| | 66 | included | not included | — | Si | — |
| | 67 | included | included | 1.0 | Si | — |
| | 68 | included | included | 0.99 | Si | — |
| | 69 | included | included | 1.0 | Si, Ti | 2.1 |
| | 70 | included | included | 1.1 | Si | — |
| | 71 | included | included | 1.1 | Si | — |
| | 72 | included | included | 0.99 | Si | — |
| | 73 | included | included | 1.0 | Si | — |
| | 74 | included | not included | — | Si | — |
| Comparative Example | 1 | included | not included | — | Si | — |
| | 2 | included | not included | — | Si | — |
| | 3 | included | included | 1.2 | Si | — |
| | 4 | not included | not included | — | — | — |
| | 5 | not included | not included | — | — | — |
| | 6 | not included | not included | — | — | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-273563, filed Dec. 14, 2011, which is hereby incorporated by reference herein in its entirety.

What is claimed is:

1. An electrophotographic member comprising a surface layer, wherein
the surface layer comprises a modified polysiloxane having a structure represented by the following formula (1):

$$\begin{array}{c} -\!\!\!\!\left[\, R1\!-\!G\,\right]\!\!- \\ | \\ L \\ | \\ R2 \end{array} \quad (1)$$

wherein, in the formula (1),
G represents a bivalent group having an ethylene oxide chain represented by (—O—C$_2$H$_4$—);
R1 represents a group selected from the group consisting of groups represented by the following formulas (2) and (3);
L represents polysiloxane having at least a SiO$_{4/2}$(Q) unit or a SiO$_{3/2}$(T) unit, the SiO$_{3/2}$(T) unit comprising a silicon-bound, non-hydrolyzable group; and
R2 represents a monovalent group selected from the group consisting of monovalent groups represented by the following formulas (4) and (5):

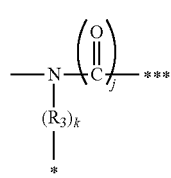

(2)

wherein, in the formula (2),
j represents 1, and k represents 0 or 1;
R3 represents a bivalent connecting group;
the symbol "*" represents the point of attachment to a silicon atom in the polysiloxane represented by L; and
the symbol "***" represents the point of attachment to an oxygen atom in the ethylene oxide chain represented by G,

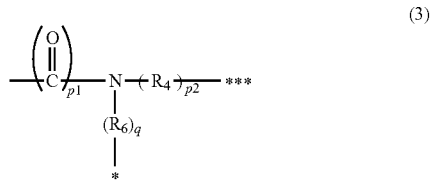

(3)

wherein, in the formula (3),
p1 and q each independently represent 0 or 1;
p2 represents 1;
R$_4$ represents an alkylene group having 1 to 10 carbon atoms;
R$_6$ represents a bivalent connecting group;

the symbol "*" represents the point of attachment to a silicon atom in the polysiloxane represented by L; and the symbol "***" represents the point of attachment to an oxygen atom in the ethylene oxide chain represented by G,

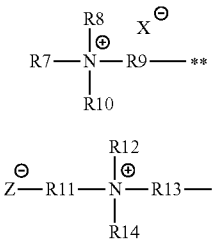
(4)

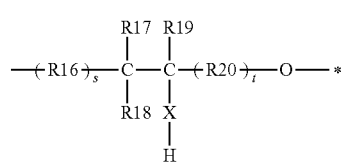
(5)

wherein, in the formulae (4) and (5),

R7, R8, R10, R12 and R14 each independently represent a hydrogen atom, an alkyl group having 1 to 10 carbon atoms, a phenyl group, an alkoxyl group having 1 to 10 carbon atoms, or a phenoxy group;

R9, R11 and R13 each represent a bivalent connecting group;

the symbol "**" represents the point of attachment to a silicon atom in the polysiloxane represented by L; and $X^-$ and $Z^-$ each independently represent an anion.

2. The electrophotographic member according to claim 1, wherein R1 of the formula (1) is a group represented by the formula (2), and in the formula (2), j is 1, k is 1 and the bivalent connecting group represented by R3 has a structure represented by the following formula (6):

$$-(\mathrm{R16})_s-\underset{\underset{\underset{H}{|}}{\underset{R18}{|}}}{\overset{R17}{\underset{|}{C}}}-\underset{\underset{X}{|}}{\overset{R19}{\underset{|}{C}}}-(\mathrm{R20})_t-\mathrm{O}-*$$ (6)

wherein s and t each independently represent 0 or 1;

R17, R18 and R19 each independently represent a hydrogen atom or an alkyl group having 1 to 5 carbon atoms;

X represents an oxygen atom or a sulfur atom; and

R16 and R20 each independently represent an alkylene group having 1 to 10 carbon atoms or a phenylene group in which a hydrogen atom may be substituted by a methyl group or an ethyl group.

3. The electrophotographic member according to claim 1, wherein

R1 of the formula (1) is a group represented by the formula (2), and in the formula (2), j is 1 and k is 0.

4. The electrophotographic member according to claim 1, wherein

R1 of the formula (1) is a group represented by the formula (3), and in the formula (3), p1, p2 and q each represent 1 and $R_6$ has a structure represented by the following formula (7):

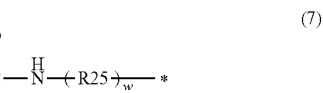
(7)

wherein, in the formula (7), v and w each independently represent an integer of 0, or 1 or more; and R21 and R25 each independently represent an alkylene group having 1 to 10 carbon atoms, or a phenylene group in which a hydrogen atom may be substituted by a methyl group or an ethyl group.

5. The electrophotographic member according to claim 1, wherein

R2 of the formula (1) has a structure represented by the formula (4), and in the formula (4), R9 has a structure represented by the following formula (8) or (9):

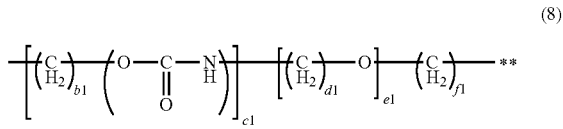
(8)

wherein b1, c1, d1, e1 and f1 each independently represent an integer of 0 or 1 to 10, and $b1+c1+d1+e1+f1 \geq 1$,

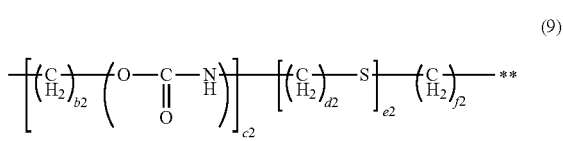
(9)

wherein b2, c2, d2, e2 and f2 each independently represent an integer of 0 or 1 to 10, and $b2+c2+d2+e2+f2 \geq 1$.

6. The electrophotographic member according to claim 1, wherein

R2 of the formula (1) has a structure represented by the formula (5), and in the formula (5), R13 has a structure represented by the following formula (11) or (12):

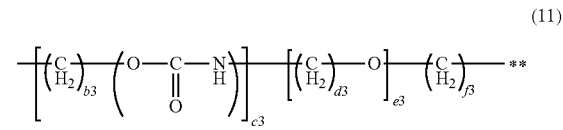
(11)

wherein, in the formula (11), b3, c3, d3, e3 and f3 each independently represent an integer of 0 or 1 to 10, and $b3+c3+d3+e3+f3 \geq 1$,

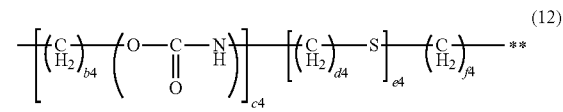
(12)

wherein, in the formula (12), b4, c4, d4, e4 and f4 each independently represent an integer of 0 or 1 to 10, and $b4+c4+d4+e4+f4 \geq 1$.

7. The electrophotographic member according to claim 6, wherein R11 of the formula (5) is an alkylene group having 1 to 10 carbon atoms.

8. A process cartridge comprising a charging member and an electrophotographic photosensitive member disposed to be chargeable by the charging member, and having a structure removable from a main body of an electrophotographic apparatus, wherein the charging member is an electrophotographic member according to claim 1.

9. An electrophotographic apparatus comprising a charging member and an electrophotographic photosensitive member disposed to be chargeable by the charging member, wherein the charging member is an electrophotographic member according to claim 1.

* * * * *